United States Patent
Ramanathan et al.

(10) Patent No.: US 9,378,005 B2
(45) Date of Patent: Jun. 28, 2016

(54) HITLESS SOFTWARE UPGRADES

(71) Applicant: Foundry Networks, LLC, San Jose, CA (US)

(72) Inventors: Rajiv Ramanathan, Cupertino, CA (US); Ron Talmor, Cupertino, CA (US); Shao-Kong Kao, San Ramon, CA (US); Anthony Ho, Fremont, CA (US); Rudramahesh Rugge, Sunnyvale, CA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

(21) Appl. No.: 13/862,160

(22) Filed: Apr. 12, 2013

(65) Prior Publication Data

US 2013/0305236 A1  Nov. 14, 2013

Related U.S. Application Data

(62) Division of application No. 11/646,845, filed on Dec. 27, 2006, now Pat. No. 8,448,162.

(60) Provisional application No. 60/762,283, filed on Jan. 25, 2006, provisional application No. 60/754,932, filed on Dec. 28, 2005.

(51) Int. Cl.
*G06F 9/44*     (2006.01)
*G06F 9/445*    (2006.01)

(52) U.S. Cl.
CPC .. *G06F 8/61* (2013.01); *G06F 8/65* (2013.01); *G06F 9/4401* (2013.01)

(58) Field of Classification Search
USPC .......................................................... 717/171
See application file for complete search history.

(56) References Cited

U.S. PATENT DOCUMENTS

| | | | |
|---|---|---|---|
| 3,866,175 A | 2/1975 | Seifert, Jr. et al. | |
| 4,325,119 A | 4/1982 | Grandmaison et al. | |
| 4,348,725 A | 9/1982 | Farrell et al. | |
| 4,628,480 A | 12/1986 | Floyd | |
| 4,667,323 A | 5/1987 | Engdahl et al. | |
| 4,679,190 A | 7/1987 | Dias et al. | |
| 4,683,564 A | 7/1987 | Young et al. | |

(Continued)

FOREIGN PATENT DOCUMENTS

| | | |
|---|---|---|
| EP | 1380127 A2 | 1/2004 |
| JP | 2003-289359 A | 10/2003 |

(Continued)

OTHER PUBLICATIONS

U.S. Appl. No. 13/925,564, filed Jun. 24, 2013 by Wong et al. (Unpublished).

(Continued)

*Primary Examiner* — Marina Lee
(74) *Attorney, Agent, or Firm* — Kilpatrick Townsend & Stockton LLP

(57) ABSTRACT

Disclosed is a technique for facilitating software upgrade for a switching system comprising a first management processor and a second management processor and a set of one or more line processors, the techniques comprising receiving a signal to perform a software upgrade for a line processor from the set of line processors, and performing a software upgrade for the line processor without substantially affecting packet switching performed by the switching system.

20 Claims, 8 Drawing Sheets

(56) References Cited

U.S. PATENT DOCUMENTS

| | | | |
|---|---|---|---|
| 4,698,748 A | 10/1987 | Juzswik et al. | |
| 4,723,243 A | 2/1988 | Joshi et al. | |
| 4,754,482 A | 6/1988 | Weiss | |
| 4,791,629 A | 12/1988 | Burns et al. | |
| 4,794,629 A | 12/1988 | Pastyr et al. | |
| 4,807,280 A | 2/1989 | Posner et al. | |
| 4,876,681 A | 10/1989 | Hagiwara et al. | |
| 4,896,277 A | 1/1990 | Vercellotti et al. | |
| 4,985,889 A | 1/1991 | Frankish et al. | |
| 5,101,404 A | 3/1992 | Kunimoto et al. | |
| 5,136,584 A | 8/1992 | Hedlund | |
| 5,195,181 A | 3/1993 | Bryant et al. | |
| 5,208,856 A | 5/1993 | Leduc et al. | |
| 5,224,108 A | 6/1993 | McDysan et al. | |
| 5,231,633 A | 7/1993 | Hluchyj et al. | |
| 5,280,582 A | 1/1994 | Yang et al. | |
| 5,282,196 A | 1/1994 | Clebowicz | |
| 5,287,477 A | 2/1994 | Johnson et al. | |
| 5,299,190 A | 3/1994 | LaMaire et al. | |
| 5,299,195 A | 3/1994 | Shah | |
| 5,301,192 A | 4/1994 | Henrion | |
| 5,307,345 A | 4/1994 | Lozowick et al. | |
| 5,323,386 A | 6/1994 | Wiher et al. | |
| 5,365,512 A | 11/1994 | Combs et al. | |
| 5,377,189 A | 12/1994 | Clark | |
| 5,390,173 A | 2/1995 | Spinney et al. | |
| 5,392,279 A | 2/1995 | Taniguchi | |
| 5,406,643 A | 4/1995 | Burke et al. | |
| 5,408,469 A | 4/1995 | Opher et al. | |
| 5,430,442 A | 7/1995 | Kaiser et al. | |
| 5,436,893 A | 7/1995 | Barnett | |
| 5,461,615 A | 10/1995 | Henrion | |
| 5,490,258 A | 2/1996 | Fenner | |
| 5,506,840 A | 4/1996 | Pauwels et al. | |
| 5,506,841 A | 4/1996 | Sandquist | |
| 5,521,923 A | 5/1996 | Willmann et al. | |
| 5,530,302 A | 6/1996 | Hamre et al. | |
| 5,539,733 A | 7/1996 | Anderson et al. | |
| 5,546,385 A | 8/1996 | Caspi et al. | |
| 5,550,816 A | 8/1996 | Hardwick et al. | |
| 5,563,948 A | 10/1996 | Diehl et al. | |
| 5,566,170 A | 10/1996 | Bakke et al. | |
| 5,598,410 A | 1/1997 | Stone | |
| 5,600,795 A | 2/1997 | Du | |
| 5,619,497 A | 4/1997 | Gallagher et al. | |
| 5,640,504 A | 6/1997 | Johnson, Jr. | |
| 5,646,878 A | 7/1997 | Samra | |
| 5,649,089 A | 7/1997 | Kilner | |
| 5,663,952 A | 9/1997 | Gentry, Jr. | |
| 5,663,959 A | 9/1997 | Nakagawa | |
| 5,666,353 A | 9/1997 | Klausmeier et al. | |
| 5,721,819 A | 2/1998 | Galles et al. | |
| 5,732,080 A | 3/1998 | Ferguson et al. | |
| 5,734,826 A | 3/1998 | Olnowich et al. | |
| 5,740,176 A | 4/1998 | Gupta et al. | |
| 5,745,708 A | 4/1998 | Weppler et al. | |
| 5,751,710 A | 5/1998 | Crowther et al. | |
| 5,802,287 A | 9/1998 | Rostoker et al. | |
| 5,802,394 A | 9/1998 | Baird et al. | |
| 5,815,146 A | 9/1998 | Youden et al. | |
| 5,818,816 A | 10/1998 | Chikazawa et al. | |
| 5,835,496 A | 11/1998 | Yeung et al. | |
| 5,838,684 A | 11/1998 | Wicki et al. | |
| 5,862,350 A | 1/1999 | Coulson | |
| 5,864,555 A | 1/1999 | Mathur et al. | |
| 5,867,675 A | 2/1999 | Lomelino et al. | |
| 5,870,538 A | 2/1999 | Manning et al. | |
| 5,872,769 A | 2/1999 | Caldara et al. | |
| 5,872,783 A | 2/1999 | Chin | |
| 5,875,200 A | 2/1999 | Glover et al. | |
| 5,896,380 A | 4/1999 | Brown et al. | |
| 5,907,566 A | 5/1999 | Benson et al. | |
| 5,907,660 A | 5/1999 | Inoue et al. | |
| 5,909,686 A | 6/1999 | Muller et al. | |
| 5,915,094 A | 6/1999 | Kouloheris et al. | |
| 5,920,566 A | 7/1999 | Hendel et al. | |
| 5,920,886 A | 7/1999 | Feldmeier | |
| 5,936,939 A | 8/1999 | Des Jardins et al. | |
| 5,936,966 A | 8/1999 | Ogawa et al. | |
| 5,956,347 A | 9/1999 | Slater | |
| 5,999,528 A | 12/1999 | Chow et al. | |
| 6,000,016 A | 12/1999 | Curtis et al. | |
| 6,011,910 A | 1/2000 | Chau et al. | |
| 6,016,310 A | 1/2000 | Muller et al. | |
| 6,023,471 A | 2/2000 | Haddock et al. | |
| 6,031,843 A | 2/2000 | Swanbery et al. | |
| 6,035,414 A | 3/2000 | Okazawa et al. | |
| 6,038,288 A | 3/2000 | Thomas et al. | |
| 6,067,298 A | 5/2000 | Shinohara | |
| 6,067,606 A | 5/2000 | Holscher et al. | |
| 6,076,115 A | 6/2000 | Sambamurthy et al. | |
| 6,081,522 A | 6/2000 | Hendel et al. | |
| 6,088,356 A | 7/2000 | Hendel et al. | |
| 6,094,434 A | 7/2000 | Kotzur et al. | |
| 6,101,552 A | 8/2000 | Chiang et al. | |
| 6,104,696 A | 8/2000 | Kadambi et al. | |
| 6,104,700 A | 8/2000 | Haddock et al. | |
| 6,104,969 A | 8/2000 | Beeks | |
| 6,108,300 A * | 8/2000 | Coile et al. | 370/217 |
| 6,108,306 A | 8/2000 | Kalkunte et al. | |
| 6,118,787 A | 9/2000 | Kalkunte et al. | |
| 6,125,417 A | 9/2000 | Bailis et al. | |
| 6,128,666 A | 10/2000 | Muller et al. | |
| 6,144,668 A | 11/2000 | Bass et al. | |
| 6,147,996 A | 11/2000 | Laor et al. | |
| 6,151,301 A | 11/2000 | Holden | |
| 6,151,497 A | 11/2000 | Yee et al. | |
| 6,154,446 A | 11/2000 | Kadambi et al. | |
| 6,157,643 A | 12/2000 | Ma | |
| 6,160,809 A | 12/2000 | Adiletta et al. | |
| 6,160,812 A | 12/2000 | Bauman et al. | |
| 6,172,990 B1 | 1/2001 | Deb et al. | |
| 6,178,520 B1 | 1/2001 | DeKoning et al. | |
| 6,181,699 B1 | 1/2001 | Crinion et al. | |
| 6,185,208 B1 | 2/2001 | Liao | |
| 6,185,222 B1 | 2/2001 | Hughes | |
| 6,194,666 B1 | 2/2001 | Hayshida et al. | |
| 6,195,335 B1 | 2/2001 | Calvignac et al. | |
| 6,201,492 B1 | 3/2001 | Amar et al. | |
| 6,212,586 B1 | 4/2001 | Mros et al. | |
| 6,222,845 B1 | 4/2001 | Shue et al. | |
| 6,229,788 B1 | 5/2001 | Graves et al. | |
| 6,243,388 B1 | 6/2001 | Mussman et al. | |
| 6,243,667 B1 | 6/2001 | Kerr et al. | |
| 6,249,528 B1 | 6/2001 | Kothary | |
| 6,263,374 B1 | 7/2001 | Olnowich et al. | |
| 6,272,144 B1 | 8/2001 | Berenbaum et al. | |
| 6,304,903 B1 | 10/2001 | Ward | |
| 6,307,839 B1 | 10/2001 | Gerszberg et al. | |
| 6,320,859 B1 | 11/2001 | Momirov | |
| 6,333,929 B1 | 12/2001 | Drottar et al. | |
| 6,335,932 B2 | 1/2002 | Kadambi et al. | |
| 6,335,935 B2 | 1/2002 | Kadambi et al. | |
| 6,343,072 B1 | 1/2002 | Bechtolsheim et al. | |
| 6,351,143 B1 | 2/2002 | Guccione et al. | |
| 6,356,550 B1 | 3/2002 | Williams | |
| 6,356,942 B1 | 3/2002 | Bengtsson et al. | |
| 6,359,879 B1 | 3/2002 | Carvey et al. | |
| 6,363,077 B1 | 3/2002 | Wong et al. | |
| 6,366,557 B1 | 4/2002 | Hunter | |
| 6,369,855 B1 | 4/2002 | Chauvel et al. | |
| 6,370,579 B1 | 4/2002 | Partridge | |
| 6,421,352 B1 | 7/2002 | Manaka et al. | |
| 6,424,658 B1 | 7/2002 | Mathur | |
| 6,424,659 B2 | 7/2002 | Viswanadham et al. | |
| 6,427,185 B1 | 7/2002 | Ryals et al. | |
| 6,430,190 B1 | 8/2002 | Essbaum et al. | |
| 6,442,067 B1 * | 8/2002 | Chawla | G06F 8/60 365/185.08 |
| 6,457,175 B1 * | 9/2002 | Lerche | 717/173 |
| 6,459,705 B1 | 10/2002 | Cheng | |
| 6,460,088 B1 | 10/2002 | Merchant | |
| 6,463,063 B1 | 10/2002 | Bianchini, Jr. et al. | |
| 6,466,608 B1 | 10/2002 | Hong et al. | |

(56) References Cited

U.S. PATENT DOCUMENTS

| | | | |
|---|---|---|---|
| 6,470,436 B1 | 10/2002 | Croft et al. | |
| 6,473,428 B1 | 10/2002 | Nichols et al. | |
| 6,473,433 B1 | 10/2002 | Bianchini, Jr. et al. | |
| 6,477,174 B1 | 11/2002 | Dooley et al. | |
| 6,480,477 B1 | 11/2002 | Treadaway et al. | |
| 6,490,280 B1 | 12/2002 | Leung | |
| 6,493,347 B2 | 12/2002 | Sindhu et al. | |
| 6,496,502 B1 | 12/2002 | Fite, Jr. et al. | |
| 6,505,281 B1 | 1/2003 | Sherry | |
| 6,510,138 B1 | 1/2003 | Pannell | |
| 6,522,656 B1 | 2/2003 | Gridley | |
| 6,532,229 B1 | 3/2003 | Johnson et al. | |
| 6,532,234 B1 | 3/2003 | Yoshikawa et al. | |
| 6,535,504 B1 | 3/2003 | Johnson et al. | |
| 6,549,519 B1 | 4/2003 | Michels et al. | |
| 6,553,370 B1 | 4/2003 | Andreev et al. | |
| 6,556,208 B1 | 4/2003 | Congdon et al. | |
| 6,567,404 B1 | 5/2003 | Wilford | |
| 6,570,884 B1 | 5/2003 | Connery et al. | |
| 6,577,631 B1 | 6/2003 | Keenan et al. | |
| 6,587,432 B1 | 7/2003 | Putzolu et al. | |
| 6,591,302 B2 | 7/2003 | Boucher et al. | |
| 6,601,186 B1 | 7/2003 | Fox et al. | |
| 6,606,300 B1 | 8/2003 | Blanc et al. | |
| 6,628,650 B1 | 9/2003 | Saite et al. | |
| 6,633,580 B1 | 10/2003 | Torudbakken et al. | |
| 6,636,483 B1 | 10/2003 | Pannell | |
| 6,640,334 B1 * | 10/2003 | Rasmussen | G06F 9/4401 717/169 |
| 6,643,269 B1 | 11/2003 | Fan et al. | |
| 6,654,342 B1 | 11/2003 | Dittia et al. | |
| 6,654,346 B1 | 11/2003 | Mahalingaiah et al. | |
| 6,654,370 B1 | 11/2003 | Quirke et al. | |
| 6,654,373 B1 | 11/2003 | Maher, III et al. | |
| 6,658,002 B1 | 12/2003 | Ross et al. | |
| 6,661,791 B1 | 12/2003 | Brown | |
| 6,671,275 B1 | 12/2003 | Wong et al. | |
| 6,675,258 B1 * | 1/2004 | Bramhall et al. | 711/114 |
| 6,677,952 B1 | 1/2004 | Baldwin | |
| 6,678,248 B1 | 1/2004 | Haddock et al. | |
| 6,681,332 B1 | 1/2004 | Byrne et al. | |
| 6,683,872 B1 | 1/2004 | Saito | |
| 6,687,217 B1 | 2/2004 | Chow et al. | |
| 6,687,247 B1 | 2/2004 | Wilford et al. | |
| 6,690,757 B1 | 2/2004 | Bunton et al. | |
| 6,691,202 B2 | 2/2004 | Vasquez et al. | |
| 6,696,917 B1 | 2/2004 | Heitner et al. | |
| 6,697,359 B1 | 2/2004 | George | |
| 6,697,368 B2 | 2/2004 | Chang et al. | |
| 6,700,894 B1 | 3/2004 | Shung | |
| 6,708,000 B1 | 3/2004 | Nishi et al. | |
| 6,721,229 B1 | 4/2004 | Cole | |
| 6,721,268 B1 | 4/2004 | Ohira et al. | |
| 6,721,313 B1 | 4/2004 | Van Duyne | |
| 6,721,338 B1 | 4/2004 | Sato | |
| 6,731,875 B1 | 5/2004 | Kartalopoulos | |
| 6,735,218 B2 | 5/2004 | Chang et al. | |
| 6,745,277 B1 | 6/2004 | Lee et al. | |
| 6,747,971 B1 | 6/2004 | Hughes et al. | |
| 6,751,224 B1 | 6/2004 | Parruck et al. | |
| 6,754,881 B2 | 6/2004 | Kuhlmann et al. | |
| 6,760,305 B1 | 7/2004 | Pasternak et al. | |
| 6,765,866 B1 | 7/2004 | Wyatt | |
| 6,775,706 B1 | 8/2004 | Fukumoto et al. | |
| 6,778,546 B1 | 8/2004 | Epps et al. | |
| 6,781,990 B1 | 8/2004 | Puri et al. | |
| 6,785,290 B1 | 8/2004 | Fujisawa et al. | |
| 6,788,697 B1 | 9/2004 | Aweya et al. | |
| 6,792,484 B1 | 9/2004 | Hook | |
| 6,792,502 B1 | 9/2004 | Pandya et al. | |
| 6,798,740 B1 | 9/2004 | Senevirathne et al. | |
| 6,804,220 B2 | 10/2004 | Odenwalder et al. | |
| 6,804,731 B1 | 10/2004 | Chang et al. | |
| 6,804,815 B1 | 10/2004 | Kerr et al. | |
| 6,807,179 B1 | 10/2004 | Kanuri et al. | |
| 6,807,363 B1 | 10/2004 | Abiko et al. | |
| 6,810,038 B1 | 10/2004 | Isoyama et al. | |
| 6,810,046 B2 | 10/2004 | Abbas et al. | |
| 6,813,243 B1 | 11/2004 | Epps et al. | |
| 6,813,266 B1 | 11/2004 | Chiang et al. | |
| 6,816,467 B1 | 11/2004 | Muller et al. | |
| 6,831,923 B1 | 12/2004 | Laor et al. | |
| 6,831,932 B1 | 12/2004 | Boyle et al. | |
| 6,836,808 B2 | 12/2004 | Bunce et al. | |
| 6,839,346 B1 | 1/2005 | Kametani | |
| 6,842,422 B1 | 1/2005 | Bianchini | |
| 6,842,903 B1 | 1/2005 | Weschler | |
| 6,854,117 B1 | 2/2005 | Roberts | |
| 6,856,600 B1 | 2/2005 | Russell et al. | |
| 6,859,438 B2 | 2/2005 | Haddock et al. | |
| 6,865,153 B1 | 3/2005 | Hill et al. | |
| 6,873,630 B1 | 3/2005 | Muller et al. | |
| 6,895,528 B2 | 5/2005 | Cantwell et al. | |
| 6,901,072 B1 | 5/2005 | Wong | |
| 6,906,936 B1 | 6/2005 | James et al. | |
| 6,912,637 B1 | 6/2005 | Herbst | |
| 6,920,154 B1 | 7/2005 | Achler | |
| 6,925,516 B2 | 8/2005 | Struhsaker et al. | |
| 6,934,305 B1 | 8/2005 | Duschatko et al. | |
| 6,937,606 B2 | 8/2005 | Basso et al. | |
| 6,946,948 B2 | 9/2005 | McCormack et al. | |
| 6,952,419 B1 | 10/2005 | Cassiday et al. | |
| 6,957,258 B2 | 10/2005 | Maher, III et al. | |
| 6,959,007 B1 | 10/2005 | Vogel et al. | |
| 6,961,347 B1 | 11/2005 | Bunton et al. | |
| 6,965,615 B1 | 11/2005 | Kerr et al. | |
| 6,973,092 B1 | 12/2005 | Zhou et al. | |
| 6,975,599 B1 | 12/2005 | Johnson et al. | |
| 6,978,309 B1 | 12/2005 | Dorbolo | |
| 6,980,552 B1 | 12/2005 | Belz et al. | |
| 6,982,974 B1 | 1/2006 | Saleh et al. | |
| 6,990,102 B1 | 1/2006 | Kaniz et al. | |
| 6,993,032 B1 | 1/2006 | Dammann et al. | |
| 6,996,663 B1 | 2/2006 | Marsteiner | |
| 7,005,812 B2 | 2/2006 | Mitchell | |
| 7,009,968 B2 | 3/2006 | Ambe et al. | |
| 7,009,976 B1 | 3/2006 | Michelson et al. | |
| 7,010,607 B1 | 3/2006 | Bunton | |
| 7,012,919 B1 | 3/2006 | So et al. | |
| 7,050,430 B2 | 5/2006 | Kalkunte et al. | |
| 7,050,505 B2 | 5/2006 | Kaku | |
| 7,065,673 B2 | 6/2006 | Subramaniam et al. | |
| 7,080,238 B2 | 7/2006 | Van Hoof et al. | |
| 7,082,133 B1 | 7/2006 | Lor et al. | |
| 7,095,753 B1 | 8/2006 | Milliken et al. | |
| 7,103,041 B1 | 9/2006 | Speiser et al. | |
| 7,106,692 B1 | 9/2006 | Schulz | |
| 7,120,744 B2 | 10/2006 | Klein | |
| 7,126,948 B2 | 10/2006 | Gooch et al. | |
| 7,126,956 B2 | 10/2006 | Scholten | |
| 7,145,914 B2 | 12/2006 | Olarig et al. | |
| 7,151,797 B2 | 12/2006 | Limberg | |
| 7,161,948 B2 | 1/2007 | Sampath et al. | |
| 7,167,471 B2 | 1/2007 | Calvignac et al. | |
| 7,176,911 B1 | 2/2007 | Kidono et al. | |
| 7,185,141 B1 | 2/2007 | James et al. | |
| 7,185,266 B2 | 2/2007 | Blightman et al. | |
| 7,187,687 B1 | 3/2007 | Davis et al. | |
| 7,188,237 B2 | 3/2007 | Zhou et al. | |
| 7,190,696 B1 | 3/2007 | Manur et al. | |
| 7,191,277 B2 | 3/2007 | Broyles | |
| 7,191,468 B2 | 3/2007 | Hanner | |
| 7,194,652 B2 * | 3/2007 | Zhou et al. | 714/4.4 |
| 7,203,194 B2 | 4/2007 | Chang et al. | |
| 7,206,283 B2 | 4/2007 | Chang et al. | |
| 7,212,536 B2 | 5/2007 | Mackiewich et al. | |
| 7,218,637 B1 | 5/2007 | Best et al. | |
| 7,219,293 B2 | 5/2007 | Tsai et al. | |
| 7,228,509 B1 | 6/2007 | Dada et al. | |
| 7,236,490 B2 | 6/2007 | Chang et al. | |
| 7,237,058 B2 | 6/2007 | Srinivasan | |
| 7,249,306 B2 | 7/2007 | Chen | |
| 7,266,117 B1 | 9/2007 | Davis | |
| 7,272,611 B1 | 9/2007 | Cuppett et al. | |

(56) References Cited

U.S. PATENT DOCUMENTS

| | | | |
|---|---|---|---|
| 7,272,613 B2 | 9/2007 | Sim et al. |
| 7,277,425 B1 | 10/2007 | Sikdar |
| 7,283,547 B1 | 10/2007 | Hook et al. |
| 7,284,236 B2 | 10/2007 | Zhou et al. |
| 7,286,534 B2 | 10/2007 | Kloth |
| 7,298,752 B2 | 11/2007 | Moriwaki et al. |
| 7,324,509 B2 | 1/2008 | Ni |
| 7,324,553 B1 | 1/2008 | Varier et al. |
| 7,355,970 B2 | 4/2008 | Lor |
| 7,356,030 B2 | 4/2008 | Chang et al. |
| 7,366,100 B2 | 4/2008 | Anderson et al. |
| 7,391,769 B2 | 6/2008 | Rajkumar et al. |
| 7,414,979 B1 | 8/2008 | Jarvis |
| 7,428,693 B2 | 9/2008 | Obuchi et al. |
| 7,468,975 B1 | 12/2008 | Davis |
| 7,512,127 B2 | 3/2009 | Chang et al. |
| 7,543,077 B1 | 6/2009 | Milliken et al. |
| 7,558,193 B2 | 7/2009 | Bradbury et al. |
| 7,561,590 B1 | 7/2009 | Walsh |
| 7,590,760 B1 | 9/2009 | Banks |
| 7,596,139 B2 | 9/2009 | Patel et al. |
| 7,606,968 B2 | 10/2009 | Branscome et al. |
| 7,609,617 B2 | 10/2009 | Appanna et al. |
| 7,613,991 B1 | 11/2009 | Bain |
| 7,624,283 B2 | 11/2009 | Bade et al. |
| 7,636,369 B2 | 12/2009 | Wong |
| 7,649,885 B1 | 1/2010 | Davis |
| 7,657,703 B1 | 2/2010 | Singh |
| 7,721,297 B2 | 5/2010 | Ward |
| 7,738,450 B1 | 6/2010 | Davis |
| 7,782,805 B1 | 8/2010 | Belhadj et al. |
| 7,813,367 B2 | 10/2010 | Wong |
| 7,817,659 B2 | 10/2010 | Wong |
| 7,821,972 B1 | 10/2010 | Finn et al. |
| 7,830,884 B2 | 11/2010 | Davis |
| 7,903,654 B2 | 3/2011 | Bansal |
| 7,933,947 B2 | 4/2011 | Fleischer et al. |
| 7,948,872 B2 | 5/2011 | Patel et al. |
| 7,953,922 B2 | 5/2011 | Singh |
| 7,953,923 B2 | 5/2011 | Singh |
| 7,978,614 B2 | 7/2011 | Wong et al. |
| 7,978,702 B2 | 7/2011 | Chang et al. |
| 7,995,580 B2 | 8/2011 | Patel et al. |
| 8,014,278 B1 | 9/2011 | Subramanian et al. |
| 8,037,399 B2 | 10/2011 | Wong et al. |
| 8,086,894 B1* | 12/2011 | Gopal et al. ................. 714/4.11 |
| 8,090,901 B2 | 1/2012 | Lin et al. |
| 8,140,044 B2 | 3/2012 | Villian et al. |
| 8,149,839 B1 | 4/2012 | Hsu et al. |
| 8,155,011 B2 | 4/2012 | Wong et al. |
| 8,170,044 B2 | 5/2012 | Davis et al. |
| 8,201,180 B2 | 6/2012 | Briscoe et al. |
| 8,238,255 B2 | 8/2012 | Suresh et al. |
| 8,271,859 B2 | 9/2012 | Wong et al. |
| 8,395,996 B2 | 3/2013 | Wong et al. |
| 8,448,162 B2* | 5/2013 | Ramanathan ............ G06F 8/65 717/171 |
| 8,493,988 B2 | 7/2013 | Wong et al. |
| 8,509,236 B2 | 8/2013 | Zhang et al. |
| 8,514,716 B2 | 8/2013 | Patel et al. |
| 8,599,850 B2 | 12/2013 | Jha et al. |
| 8,619,781 B2 | 12/2013 | Patel et al. |
| 8,671,219 B2 | 3/2014 | Davis |
| 8,718,051 B2 | 5/2014 | Wong |
| 8,730,961 B1 | 5/2014 | Wong |
| 8,811,390 B2 | 8/2014 | Wong |
| 9,030,937 B2 | 5/2015 | Patel et al. |
| 9,030,943 B2 | 5/2015 | Suresh et al. |
| 2001/0001879 A1 | 5/2001 | Kubik et al. |
| 2001/0007560 A1 | 7/2001 | Masuda et al. |
| 2001/0026551 A1 | 10/2001 | Horlin |
| 2001/0048785 A1 | 12/2001 | Steinberg |
| 2001/0053150 A1 | 12/2001 | Clear et al. |
| 2002/0001307 A1 | 1/2002 | Nguyen et al. |
| 2002/0012585 A1 | 1/2002 | Kalkunte et al. |
| 2002/0040417 A1 | 4/2002 | Winograd et al. |
| 2002/0048280 A1 | 4/2002 | Lee et al. |
| 2002/0054594 A1 | 5/2002 | Hoof et al. |
| 2002/0054595 A1 | 5/2002 | Ambe et al. |
| 2002/0069294 A1 | 6/2002 | Herkersdorf et al. |
| 2002/0073073 A1 | 6/2002 | Cheng |
| 2002/0083111 A1 | 6/2002 | Row et al. |
| 2002/0085499 A1 | 7/2002 | Toyoyama et al. |
| 2002/0087788 A1 | 7/2002 | Morris |
| 2002/0089937 A1 | 7/2002 | Venkatachary et al. |
| 2002/0089977 A1 | 7/2002 | Chang et al. |
| 2002/0091844 A1 | 7/2002 | Craft et al. |
| 2002/0091884 A1 | 7/2002 | Chang et al. |
| 2002/0097713 A1 | 7/2002 | Chang et al. |
| 2002/0105966 A1 | 8/2002 | Patel et al. |
| 2002/0126672 A1 | 9/2002 | Chow et al. |
| 2002/0131437 A1 | 9/2002 | Tagore-Brage |
| 2002/0141403 A1 | 10/2002 | Akahane et al. |
| 2002/0146013 A1 | 10/2002 | Karlsson et al. |
| 2002/0161929 A1 | 10/2002 | Longerbeam et al. |
| 2002/0161967 A1 | 10/2002 | Kirihata et al. |
| 2002/0169786 A1 | 11/2002 | Richek |
| 2002/0181476 A1 | 12/2002 | Badamo et al. |
| 2002/0191605 A1 | 12/2002 | Lunteren et al. |
| 2003/0009466 A1 | 1/2003 | Ta et al. |
| 2003/0012198 A1 | 1/2003 | Kaganoi et al. |
| 2003/0033435 A1 | 2/2003 | Hanner |
| 2003/0043800 A1 | 3/2003 | Sonksen et al. |
| 2003/0043848 A1 | 3/2003 | Sonksen |
| 2003/0048785 A1 | 3/2003 | Calvignac et al. |
| 2003/0061459 A1 | 3/2003 | Aboulenein et al. |
| 2003/0074657 A1 | 4/2003 | Bramley, Jr. |
| 2003/0081608 A1 | 5/2003 | Barri et al. |
| 2003/0095548 A1 | 5/2003 | Yamano |
| 2003/0101276 A1 | 5/2003 | Park et al. |
| 2003/0103499 A1 | 6/2003 | Davis et al. |
| 2003/0103500 A1 | 6/2003 | Menon et al. |
| 2003/0108052 A1 | 6/2003 | Inoue et al. |
| 2003/0110180 A1 | 6/2003 | Calvignac et al. |
| 2003/0115403 A1 | 6/2003 | Bouchard et al. |
| 2003/0120861 A1 | 6/2003 | Calle et al. |
| 2003/0128668 A1 | 7/2003 | Yavatkar et al. |
| 2003/0137978 A1 | 7/2003 | Kanetake |
| 2003/0152084 A1 | 8/2003 | Lee et al. |
| 2003/0152096 A1 | 8/2003 | Chapman |
| 2003/0156586 A1 | 8/2003 | Lee et al. |
| 2003/0159086 A1 | 8/2003 | Arndt |
| 2003/0165160 A1 | 9/2003 | Minami et al. |
| 2003/0169470 A1 | 9/2003 | Alagar et al. |
| 2003/0174719 A1 | 9/2003 | Sampath et al. |
| 2003/0177209 A1* | 9/2003 | Kwok et al. ................. 709/221 |
| 2003/0177221 A1 | 9/2003 | Ould-Brahim et al. |
| 2003/0198182 A1 | 10/2003 | Pegrum et al. |
| 2003/0200343 A1 | 10/2003 | Greenblat et al. |
| 2003/0214956 A1 | 11/2003 | Navada et al. |
| 2003/0215029 A1 | 11/2003 | Limberg |
| 2003/0223424 A1 | 12/2003 | Anderson et al. |
| 2003/0223466 A1 | 12/2003 | Noronha, Jr. et al. |
| 2003/0227943 A1 | 12/2003 | Hallman et al. |
| 2004/0022263 A1 | 2/2004 | Zhao et al. |
| 2004/0028060 A1 | 2/2004 | Kang |
| 2004/0037302 A1 | 2/2004 | Varma et al. |
| 2004/0054867 A1 | 3/2004 | Stravers et al. |
| 2004/0062130 A1 | 4/2004 | Chiang |
| 2004/0062245 A1 | 4/2004 | Sharp et al. |
| 2004/0062246 A1 | 4/2004 | Boucher et al. |
| 2004/0083404 A1 | 4/2004 | Subramaniam et al. |
| 2004/0083475 A1* | 4/2004 | Todd et al. ................. 718/102 |
| 2004/0088469 A1 | 5/2004 | Levy |
| 2004/0120322 A1 | 6/2004 | Wu |
| 2004/0128434 A1 | 7/2004 | Khanna et al. |
| 2004/0141504 A1 | 7/2004 | Blanc |
| 2004/0179548 A1 | 9/2004 | Chang et al. |
| 2004/0190547 A1 | 9/2004 | Gordy et al. |
| 2004/0196859 A1 | 10/2004 | Benner |
| 2004/0205393 A1 | 10/2004 | Kitamorn et al. |
| 2004/0208177 A1 | 10/2004 | Ogawa |
| 2004/0208181 A1 | 10/2004 | Clayton et al. |
| 2004/0223502 A1 | 11/2004 | Wybenga et al. |

(56) References Cited

U.S. PATENT DOCUMENTS

| | | |
|---|---|---|
| 2004/0235480 A1 | 11/2004 | Rezaaifar et al. |
| 2004/0264380 A1 | 12/2004 | Kalkunte et al. |
| 2005/0010630 A1 | 1/2005 | Doering et al. |
| 2005/0010849 A1 | 1/2005 | Ryle et al. |
| 2005/0041684 A1 | 2/2005 | Reynolds et al. |
| 2005/0089049 A1 | 4/2005 | Chang et al. |
| 2005/0097432 A1 | 5/2005 | Obuchi et al. |
| 2005/0120122 A1 | 6/2005 | Farnham |
| 2005/0132132 A1 | 6/2005 | Rosenbluth et al. |
| 2005/0132179 A1 | 6/2005 | Glaum et al. |
| 2005/0138276 A1 | 6/2005 | Navada et al. |
| 2005/0144369 A1 | 6/2005 | Jaspers |
| 2005/0152324 A1 | 7/2005 | Benveniste |
| 2005/0152335 A1 | 7/2005 | Lodha et al. |
| 2005/0169317 A1 | 8/2005 | Pruecklmayer |
| 2005/0175018 A1 | 8/2005 | Wong |
| 2005/0185577 A1 | 8/2005 | Sakamoto et al. |
| 2005/0185652 A1 | 8/2005 | Iwamoto |
| 2005/0193316 A1 | 9/2005 | Chen |
| 2005/0201387 A1 | 9/2005 | Willis |
| 2005/0226236 A1 | 10/2005 | Klink |
| 2005/0246508 A1 | 11/2005 | Shaw |
| 2005/0249124 A1 | 11/2005 | Elie-Dit-Cosaque et al. |
| 2006/0031610 A1 | 2/2006 | Liav et al. |
| 2006/0034452 A1 | 2/2006 | Tonomura |
| 2006/0050690 A1 | 3/2006 | Epps et al. |
| 2006/0077891 A1 | 4/2006 | Smith et al. |
| 2006/0092829 A1 | 5/2006 | Brolin et al. |
| 2006/0092929 A1 | 5/2006 | Chun |
| 2006/0114876 A1 | 6/2006 | Kalkunte |
| 2006/0146374 A1 | 7/2006 | Ng et al. |
| 2006/0165089 A1 | 7/2006 | Klink |
| 2006/0209685 A1 | 9/2006 | Rahman et al. |
| 2006/0221841 A1 | 10/2006 | Lee et al. |
| 2006/0268680 A1 | 11/2006 | Roberts et al. |
| 2006/0274749 A1 | 12/2006 | Beier |
| 2007/0038798 A1 | 2/2007 | Bouchard et al. |
| 2007/0088974 A1 | 4/2007 | Chandwani et al. |
| 2007/0127464 A1 | 6/2007 | Jain et al. |
| 2007/0162565 A1* | 7/2007 | Hanselmann ............ G06F 8/67 709/219 |
| 2007/0179909 A1 | 8/2007 | Channasagara |
| 2007/0208876 A1 | 9/2007 | Davis |
| 2007/0253420 A1 | 11/2007 | Chang et al. |
| 2007/0258475 A1 | 11/2007 | Chinn et al. |
| 2007/0288690 A1 | 12/2007 | Wang et al. |
| 2008/0002707 A1 | 1/2008 | Davis |
| 2008/0025309 A1 | 1/2008 | Swallow |
| 2008/0031263 A1 | 2/2008 | Ervin et al. |
| 2008/0037544 A1 | 2/2008 | Yano et al. |
| 2008/0049742 A1 | 2/2008 | Bansal et al. |
| 2008/0069125 A1 | 3/2008 | Reed et al. |
| 2008/0092020 A1 | 4/2008 | Hasenplaugh et al. |
| 2008/0095169 A1 | 4/2008 | Chandra et al. |
| 2008/0117075 A1 | 5/2008 | Seddigh et al. |
| 2008/0126652 A1 | 5/2008 | Vembu et al. |
| 2008/0159309 A1 | 7/2008 | Sultan et al. |
| 2008/0181103 A1 | 7/2008 | Davies |
| 2008/0205407 A1 | 8/2008 | Chang et al. |
| 2008/0307288 A1 | 12/2008 | Ziesler et al. |
| 2009/0175178 A1 | 7/2009 | Yoon et al. |
| 2009/0207838 A1 | 8/2009 | Milliken et al. |
| 2009/0279423 A1 | 11/2009 | Suresh et al. |
| 2009/0279440 A1 | 11/2009 | Wong et al. |
| 2009/0279441 A1 | 11/2009 | Wong et al. |
| 2009/0279541 A1 | 11/2009 | Wong et al. |
| 2009/0279542 A1 | 11/2009 | Wong et al. |
| 2009/0279546 A1 | 11/2009 | Davis |
| 2009/0279548 A1 | 11/2009 | Davis et al. |
| 2009/0279549 A1* | 11/2009 | Ramanathan ............ G06F 8/65 370/395.4 |
| 2009/0279558 A1 | 11/2009 | Davis et al. |
| 2009/0279559 A1 | 11/2009 | Wong et al. |
| 2009/0279561 A1 | 11/2009 | Chang et al. |
| 2009/0282148 A1 | 11/2009 | Wong et al. |
| 2009/0282322 A1 | 11/2009 | Wong et al. |
| 2009/0287952 A1 | 11/2009 | Patel et al. |
| 2009/0290499 A1 | 11/2009 | Patel et al. |
| 2010/0034215 A1 | 2/2010 | Patel et al. |
| 2010/0046521 A1 | 2/2010 | Wong |
| 2010/0061393 A1 | 3/2010 | Wong |
| 2010/0100671 A1 | 4/2010 | Singh |
| 2010/0135313 A1 | 6/2010 | Davis |
| 2010/0161894 A1 | 6/2010 | Singh |
| 2010/0246588 A1 | 9/2010 | Davis |
| 2010/0293327 A1 | 11/2010 | Lin et al. |
| 2011/0002340 A1 | 1/2011 | Davis |
| 2011/0044340 A1 | 2/2011 | Bansal et al. |
| 2011/0069711 A1 | 3/2011 | Jha et al. |
| 2011/0110237 A1 | 5/2011 | Wong et al. |
| 2011/0173386 A1 | 7/2011 | Milliken et al. |
| 2012/0023309 A1 | 1/2012 | Abraham et al. |
| 2012/0026868 A1 | 2/2012 | Chang et al. |
| 2012/0163389 A1 | 6/2012 | Zhang et al. |
| 2012/0236722 A1 | 9/2012 | Patel et al. |
| 2012/0275294 A1 | 11/2012 | Suresh et al. |
| 2012/0294312 A1 | 11/2012 | Davis et al. |
| 2013/0034098 A1 | 2/2013 | Davis |
| 2013/0305236 A1* | 11/2013 | Ramanathan ............ G06F 8/65 717/171 |
| 2013/0343199 A1 | 12/2013 | Wong et al. |
| 2014/0023086 A1 | 1/2014 | Patel et al. |
| 2014/0133488 A1 | 5/2014 | Patel et al. |
| 2014/0153389 A1 | 6/2014 | Wong et al. |
| 2014/0233423 A1 | 8/2014 | Jha et al. |

FOREIGN PATENT DOCUMENTS

| | | |
|---|---|---|
| JP | 2004-537871 A | 12/2004 |
| WO | WO 01/84728 A1 | 11/2001 |
| WO | WO 02/41544 A3 | 5/2002 |

OTHER PUBLICATIONS

U.S. Appl. No. 13/766,330, filed Feb. 13, 2013 by Wong et al. (Unpublished).
International Search Report for Application No. PCT/US03/08719, Mailed Jun. 17, 2003, 1 page.
Belhadj et al., "Feasibility of a 100GE MAC", PowerPoint Presentation, IEEE Meeting Nov. 2006, Nov. 13-15, 2006, 18 pages.
Braun et al., "Fast incremental CRC updates for IP over ATM networks," IEEE Workshop on High Performance Switching and Routing, 2001, 6 pages.
10 Gigabit Ethernet—Technology Overview White Paper, Sep. 2001, 16 pages.
10 Gigabit Ethernet Alliance, Interconnection with Wide Area Networks, Version 1.0, Mar. 2002, 6 pages.
Degermark, M., et al., "Small Forwarding Tables for Fast Routing Lookups," ACM Computer Communications Review 27(4), Oct. 1997, 12 pages.
Foundry Networks, "BigIron Architecture Technical Brief," Oct. 1998—Version 1.0, 15 pages.
Foundry Networks, "BigIron Architecture Technical Brief," Oct. 1998—Version 1.02, 15 pages.
Foundry Networks, "BigIron Architecture Technical Brief," Dec. 1998—Version 1.03, 14 pages.
Foundry Networks, "BigIron Architecture Technical Brief," May 1999—Version 2.0, 15 pages.
Foundry Networks, "BigIron Architecture Technical Brief," May 1999—Version 2.01, 15 pages.
Foundry Networks, "BigIron Architecture Technical Brief," Jul. 2001—Version 2.02, 16 pages.
Foundry Networks, Foundry Networks, "Next Generation Terabit System Architecture—The High Performance Revolution for 10 Gigabit Networks," Nov. 17, 2003, 27 pages.
Gigabit Ethernet Alliance—"Accelerating the Standard for Speed," Copyright 1998, 19 pages.
Kichorowsky, R., et al., "Mindspeed.TM. Switch Fabric Offers the Most Comprehensive Solution for Multi-Protocol Networking Equipment," Apr. 30, 2001, 3 pages.

(56) References Cited

OTHER PUBLICATIONS

Matsumoto, C., et al., "Switch Fabrics Touted At Interconnects Conference," Aug. 21, 2000, URL= http://www.eetimes.com/story/OEG2000821S0011, accessed Aug. 12, 2002, 2 pages.
McAuley, A., et al., "Fast Routing Table Lookup Using CAMs," Proceedings of INFOCOM, Mar.-Apr. 1993, 10 pages.
Foundry Networks, "JetCore™ Based Chassis Systems—An Architecture Brief on NetIron, BigIron, and FastIron Systems," Jan. 17, 2003, 27 pages.
Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.
Mier Communications, Inc., "Lab Testing Summary Report—Product Category: Gigabit Backbone Switches, Vendor Tested: Foundry Networks, Product Tested: BigIron 4000," Report No. 210998, Sep. 1998, 6 pages.
Mindspeed—A Conexant Business, "Switch Fabric Chipset—CX27300 iScale.TM.," Apr. 30, 2001, 2 pages.
Mindspeed—A Conexant Business, "17×17 3.2 Gbps Crosspoint Switch with Input Equalization—M21110," Feb. 1, 2001, 2 pages.
The Tolly Group, "Foundry Networks, Inc.—BigIron 4000, Layer 2 & Layer 3 Interoperability Evaluation," No. 199133, Oct. 1999, 4 pages.
The Tolly Group, "Foundry Networks, Inc.—BigIron 8000 Gigabit Ethernet Switching Router, Layer 2 & Layer 3 Performance Evaluation," No. 199111, May 1999, 4 pages.
Satran et al., "Out of Order Incremental CRC Computation," IEEE Transactions on Computers, Feb. 25, 2003, 11 pages, vol. 54, Issue 9.
Spurgeon, C., "Éthernet, The Definitive Guide," O'Reilly & Associates, Inc., Sebastapol, CA, Feb. 2000.
ANSI/IEEE Standard 802.1D, 1998 Edition (373 pages).
Newton, Newton's Telecom Dictionary, CMP Books, Mar. 2004, 20th Ed., 3 pages.
International Preliminary Examination Report for Application No. PCT/US2001/043113, mailed Nov. 6, 2003, 6 pages.
Written Opinion of the International Searching Authority for Application No. PCT/US2001/043113, mailed May 1, 2003, 6 pages.
International Search Report for Application No. PCT/US2001/043113, mailed Dec. 13, 2002, 2 pages.
Final Office Action for U.S. Appl. No. 11/745,008, mailed on Jun. 28, 2012, 13 pages.
Final Office Action for U.S. Appl. No. 11/646,845, mailed on Jul. 5, 2012, 17 pages.
Non-Final Office Action for U.S. Appl. No. 12/900,279 mailed Aug. 30, 2012, 9 pages.
Non-Final Office Action for U.S. Appl. No. 12/198,710 mailed Sep. 13, 2012, 18 pages.
Non-Final Office Action for U.S. Appl. No. 13/083,481 mailed Oct. 4, 2012, 9 pages.
Non-Final Office Action for U.S. Appl. No. 12/880,518 mailed Oct. 30, 2012, 7 pages.
Non-Final Office Action for U.S. Appl. No. 13/152,715 mailed on Nov. 13, 2012, 6 pages.
Notice of Allowance for U.S. Appl. No. 11/953,742 mailed on Nov. 13, 2012, 7 pages.
Non-Final Office Action for U.S. Appl. No. 13/398,725 mailed on Nov. 28, 2012, 10 pages.
Non-Final Office Action for U.S. Appl. No. 09/855,024 mailed Jun. 4, 2002, 9 pages.
Final Office Action for U.S. Appl. No. 09/855,024, mailed Jan. 15, 2003, 14 pages.
Advisory Action for U.S. Appl. No. 09/855,024 mailed May 2, 2003, 7 pages.
Notice of Allowance for U.S. Appl. No. 09/855,024 mailed Nov. 3, 2003, 5 pages.
Notice of Allowance for U.S. Appl. No. 09/855,024 mailed Dec. 15, 2003. 3 pages.
Non-Final Office Action for U.S. Appl. No. 10/810,301 mailed Mar. 17, 2005,11 pages.
Non-Final Office Action for U.S. Appl. No. 10/810,301, mailed Feb. 16, 2006, 12 pages.
Non-Final Office Action for U.S. Appl. No. 10/210,041, mailed Sep. 10, 2003, 12 pages.
Final Office Action for U.S. Appl. No. 10/210,041, mailed Jan. 7, 2004, 14 pages.
Non-Final Office Action for U.S. Appl. No. 10/210,041, mailed Mar. 11, 2004, 12 pages.
Final Office Action for U.S. Appl. No. 10/210,041, mailed Jul. 7, 2004, 13 pages.
Non-Final Office Action for U.S. Appl. No. 10/210,041, mailed Feb. 9, 2005, 7 pages.
Final Office Action for U.S. Appl. No. 10/210,041, mailed Aug. 24, 2005, 7 pages.
Advisory Action for U.S. Appl. No. 10/210,041, mailed Dec. 13, 2005, 4 pages.
Notice of Allowance for U.S. Appl. No. 10/810,301, mailed Feb. 6, 2007, 9 pages.
Non-Final Office Action for U.S. Appl. No. 09/855,025, mailed Nov. 23, 2004, 17 pages.
Non-Final Office Action for U.S. Appl. No. 09/855,031, mailed May 22, 2002, 10 pages.
Non-Final Office Action for U.S. Appl. No. 09/855,031, mailed Dec. 10, 2002, 10 pages.
Final Office Action for U.S. Appl. No. 09/855,031, mailed Jul. 30, 2003, 13 pages.
Notice of Allowance for U.S. Appl. No. 09/855,031, mailed Nov. 4, 2003, 5 pages.
Non-Final Office Action for U.S. Appl. No. 10/736,680, mailed Feb. 16, 2006, 18 pages.
Final Office Action for U.S. Appl. No. 10/736,680, mailed Aug. 3, 2006, 10 pages.
Notice of Allowance for U.S. Appl. No. 10/736,680, mailed Feb. 22, 2007, 12 pages.
Non-Final Office Action for U.S. Appl. No. 10/210,108, mailed Jun. 12, 2003, 5 pages.
Notice of Allowance for U.S. Appl. No. 10/210,108, mailed Oct. 7, 2003, 5 pages.
Requirement for Restriction/Election for U.S. Appl. No. 10/438,545, mailed Oct. 31, 2003, 3 pages.
Non-Final Office Action for U.S. Appl. No. 10/438,545, mailed Dec. 19, 2003, 5 pages.
Notice of Allowance for U.S. Appl. No. 10/438,545, mailed Jun. 15, 2004, 6 pages.
Non-Final Office Action for U.S. Appl. No. 10/832,086, mailed Sep. 19, 2007, 11 pages.
Final Office Action for U.S. Appl. No. 10/832,086, mailed May 1, 2008, 31 pages.
Advisory Action for U.S. Appl. No. 10/832,086, mailed Jul. 21, 2008, 4 pages.
Non-Final Office Action for U.S. Appl. No. 10/832,086, mailed Sep. 18, 2008, 18 pages.
Non Final Office Action for U.S. Appl. No. 10/832,086, mailed Apr. 1, 2009 ,17 pages.
Final Office Action for U.S. Appl. No. 10/832,086, mailed Sep. 29, 2009, 26 pages.
Non-Final Office Action for U.S. Appl. No. 11/586,991, mailed Oct. 2, 2008, 23 pages.
Non-Final Office Action for U.S. Appl. No. 11/646,845, mailed on Oct. 4, 2010, 47 pages.
Final Office Action for U.S. Appl. No. 11/646,845, mailed on Jun. 9, 2011, 22 pages.
Non-Final Office Action for U.S. Appl. No. 11/646,845, mailed on Oct. 14, 2011, 19 pages.
Final Office Action for U.S. Appl. No. 12/900,279 mailed on Dec. 5, 2012, 8 pages.
Non-Final Office Action for U.S. Appl. No. 11/831,950, mailed Aug. 18, 2009, 49 pages.
Final Office Action for U.S. Appl. No. 11/831,950, mailed on Jan. 6, 2010, 23 pages.
Advisory Action for U.S. Appl. No. 11/831,950, mailed on Mar. 4, 2010, 4 pages.

(56) References Cited

OTHER PUBLICATIONS

Non-Final Office Action for U.S. Appl. No. 11/831,950, mailed Aug. 26, 2011, 45 pages.
Final Office Action for U.S. Appl. No. 11/831,950, mailed on Feb. 28, 2012, 20 pages.
Notice of Allowance for U.S. Appl. No. 11/831,950, mailed May 16, 2012, 9 pages.
Non-Final Office Action for U.S. Appl. No. 11/953,742, mailed on Nov. 19, 2009, 51 pages.
Final Office Action for U.S. Appl. No. 11/953,742, mailed on Jun. 14, 2010, 21 pages.
Non-Final Office Action for U.S. Appl. No. 11/953,742, mailed on Mar. 30, 2011, 23 pages.
Final Office Action for U.S. Appl. No. 11/953,742, mailed on Oct. 26, 2011, 19 pages.
Non-Final Office Action for U.S. Appl. No. 11/953,743, mailed on Nov. 23, 2009, 47 pages.
Final Office Action for U.S. Appl. No. 11/953,743, mailed on Jul. 15, 2010, 21 pages.
Notice of Allowance for U.S. Appl. No. 11/953,743, mailed on Apr. 28, 2011, 19 pages.
Non-Final Office Action for U.S. Appl. No. 11/953,745, mailed on Nov. 24, 2009, 48 pages.
Non-Final Office Action for U.S. Appl. No. 11/953,745, mailed on Jun. 14, 2010, 19 pages.
Non-Final Office Action for U.S. Appl. No. 11/953,751, mailed on Nov. 16, 2009, 55 pages.
Final Office Action for U.S. Appl. No. 11/953,751, mailed on Jun. 25, 2010, 24 pages.
Non-Final Office Action for U.S. Appl. No. 11/953,751, mailed on Mar. 29, 2011, 31 pages.
Notice of Allowance for U.S. Appl. No. 11/953,751, mailed Dec. 7, 2011, 12 pages.
Supplemental Notice of Allowance for U.S. Appl. No. 11/953,751, mailed Dec. 27, 2011, 6 pages.
Non-Final Office Action for U.S. Appl. No. 11/779,778, mailed on Feb. 2, 2011, 63 pages.
Notice of Allowance for U.S. Appl. No. 11/779,778, mailed on Jul. 28, 2011, 11 pages.
Non-Final Office Action for U.S. Appl. No. 11/779,714, mailed Sep. 1, 2009, 58 pages.
Non-Final Office Action for U.S. Appl. No. 11/779,714, mailed on Mar. 31, 2010, 29 pages.
Final Office Action for U.S. Appl. No. 11/779,714, mailed on Nov. 9, 2010, 24 pages.
Non-Final Office Action for U.S. Appl. No. 12/624,300 mailed on Dec. 31, 2012, 13 pages.
Non-Final Office Action for U.S. Appl. No. 10/810,208, mailed Jul. 16, 2007, 24 pages.
Non-Final Office Action for U.S. Appl. No. 10/810,208, mailed Dec. 18, 2007, 40 pages.
Final Office Action for U.S. Appl. No. 10/810,208, mailed Jun. 11, 2008, 34 pages.
Advisory Action for U.S. Appl. No. 10/810,208, mailed Aug. 27, 2008, 4 pages.
Non-Final Office Action for U.S. Appl. No. 10/810,208, mailed Feb. 13, 2009, 17 pages.
Non-Final Office Action for U.S. Appl. No. 10/810,208, mailed Aug. 24, 2009, 38 pages.
Non-Final Office Action for U.S. Appl. No. 10/810,208, mailed on Feb. 5, 2010, 15 pages.
Notice of Allowance for U.S. Appl. No. 10/810,208, mailed on Jul. 15, 2010, 15 pages.
Non-Final Office Action for U.S. Appl. No. 11/668,322, mailed on Jun. 22, 2010, 16 pages.
Requirement for Restriction/Election for U.S. Appl. No. 10/140,752, mailed May 18, 2006, 8 pages.
Non-Final Office Action for U.S. Appl. No. 10/140,752, mailed Dec. 14, 2006, 17 pages.
Non-Final Office Action for U.S. Appl. No. 10/140,752, mailed Apr. 23, 2007, 6 pages.
Non-Final Office Action for U.S. Appl. No. 10/140,752, mailed Jan. 24, 2008, 8 pages.
Notice of Allowance of U.S. Appl. No. 10/140,752, mailed Jul. 24, 2008, 14 pages.
Notice of Allowance of U.S. Appl. No. 10/140,752, mailed Sep. 10, 2008, 5 pages.
Non-Final Office Action for U.S. Appl. No. 11/668,322, Dated Mar. 23, 2009, 19 pages.
Requirement for Restriction/Election for U.S. Appl. No. 11/668,322, mailed on Oct. 29, 2009, 6 pages.
Final Office Action for U.S. Appl. No. 11/668,322, mailed on Feb. 24, 2010, 33 pages.
Final Office Action for U.S. Appl. No. 11/668,322, mailed on Feb. 1, 2011, 17 pages.
Non-Final Office Action for U.S. Appl. No. 11/668,322, mailed on Aug. 30, 2011 17 pages.
Notice of Allowance for U.S. Appl. No. 11/668,322, mailed on Feb. 10, 2012, 20 pages.
Non-Final Office Action for U.S. Appl. No. 11/854,486, mailed Jul. 20, 2009, 29 pages.
Non-Final Office Action for U.S. Appl. No. 11/854,486, mailed on Jan. 12, 2010, 23 pages.
Notice of Allowance for U.S. Appl. No. 11/854,486, mailed on Jul. 13, 2010, 12 pages.
Non-Final Office Action for U.S. Appl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.
Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Notice of Allowance for U.S. Appl. No. 10/139,912, mailed on Oct. 19, 2009, 17 pages.
Supplemental Notice of Allowance for U.S Appl. No. 10/139,912, mailed on Nov. 23, 2009, 4 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.
Final Office Action for U.S. Appl. No. 10/140,751, mailed May 28, 2008, 19 pages.
Non-Final Office Action for U.S. Appl. No. 10/140,751, mailed Sep. 17, 2008, 16 pages.
Final Office Action for U.S. Appl. No. 10/140,751, Mailed Mar. 17, 2009, 17 pages.
Advisory Action for U.S. Appl. No. 10/140,751, mailed Jun. 1, 2009, 3 pages.
Non-Final Office Action for U.S. Appl. No. 10/140,751, mailed on Sep. 28, 2009, 34 pages.
Final Office Action for U.S. Appl. No. 10/140,751, mailed on Mar. 25, 2010, 29 pages.
Non-Final Office Action for U.S. Appl. No. 10/140,751, mailed Dec. 20, 2010, 23 pages.
Final Office Action for U.S. Appl. No. 10/140,751, mailed on Jun. 28, 2011, 23 pages.
Non-Final Office Action for U.S. Appl. No. 11/745,008, Mailed May 14, 2009, 27 pages.
Final Office Action for U.S. Appl. No. 11/745,008, mailed on Dec. 30, 2009, 27 pages.

(56) References Cited

OTHER PUBLICATIONS

Advisory Action for U.S. Appl. No. 11/745,008, mailed on Apr. 21, 2010, 8 pages.
Non-Final Office Action for U.S. Appl. No. 11/745,008, mailed on Sep. 14, 2011, 26 pages.
Notice of Allowance for U.S. Appl. No. 11/646,845 mailed on Jan. 8, 2013, 8 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appl. No. 10/139,831, mailed Jun. 26, 2007, 10 pages.
Non-Final Office Action for U.S. Appl. No. 11/828,246, mailed Jun. 15, 2009, 26 pages.
Notice of Allowance for U.S. Appl. No. 11/828,246, mailed on Nov. 16, 2009, 4 pages.
Non-Final Office Action for U.S. Appl. No. 12/702,031, mailed on Apr. 29, 2011, 5 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 11/621,038, Mailed Apr. 23, 2009, 44 pages.
Final Office Action for U.S. Appl. No. 11/621,038, mailed on Dec. 23, 2009, 10 pages.
Notice of Allowance for U.S. Appl. No. 11/621,038, mailed on Apr. 28, 2010, 5 pages.
Non-Final Office Action for U.S. Appl. No. 12/795,492, mailed on Mar. 17, 2011, 15 pages.
Final Office Action for U.S. Appl. No. 12/795,492, mailed on Jul. 20, 2011, 11 pages.
Notice of Allowance for U.S. Appl. No. 12/795,492, mailed on Nov. 14, 2011, 10 pages.
Non-Final Office Action for U.S. Appl. No. 12/198,697, mailed on Feb. 2, 2010, 19 pages.
Final Office Action for U.S. Appl. No. 12/198,697, mailed on Aug. 2, 2010, 22 pages.
Non-Final Office Action for U.S. Appl. No. 12/198,697, mailed on Oct. 25, 2010, 23 pages.
Non-Final Office Action for U.S. Appl. No. 12/198,697, mailed on May 20, 2011, 43 pages.
Notice of Allowance for U.S. Appl. No. 12/198,697, mailed Nov. 28, 2011, 12 pages.
Notice of Allowance for U.S. Appl. No. 12/198,697, mailed Jan. 5, 2012, 4 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.
Final Office Action for U.S. Appl. No. 10/140,749, mailed Dec. 8, 2008, 30 pages.
Non-Final Office Action for U.S. Appl. No. 10/140,749, mailed May 27, 2009, 38 pages.
Final Office Action for U.S. Appl. No. 10/140,749, mailed Jan. 13, 2010, 28 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Non-Final Office Action for U.S. Appl. No. 12/198,710, mailed on Sep. 28, 2010, 14 pages.
Non-Final Office Action for U.S. Appl. No. 12/198,710, mailed on Mar. 24, 2011, 39 pages.
Final Office Action for U.S. Appl. No. 12/198,710, mailed on Oct. 19, 2011, 58 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 10 pages.
Non-Final Office Action for U.S. Appl. No. 11/000,359, mailed May 29, 2009, 14 pages.
Notice of Allowance for U.S. Appl. No. 11/000,359, mailed on Sep. 22, 2009, 4 pages.
Requirement for Restriction/Election for U.S. Appl. No. 12/608,972, mailed May 17, 2012, 5 pages.
Requirement for Restriction/Election for U.S. Appl. No. 11/118,697, mailed Jun. 2, 2009, 8 pages.
Notice of Allowance for U.S. Appl. No. 11/118,697, mailed on Sep. 30, 2009, 7 pages.
Requirement for Restriction/Election for U.S. Appl. No. 12/639,749, mailed on Dec. 7, 2010, 6 pages.
Notice of Allowance for U.S. Appl. No. 12/639,749, mailed on Feb. 11, 2011, 8 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.
Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Non-Final Office Action for U.S. Appl. No. 12/639,762, mailed on Sep. 1, 2010, 5 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.
Final Office Action for U.S. Appl. No. 09/988,066, mailed Oct. 31, 2007, 16 pages.
Notice of Allowance for U.S. Appl. No. 12/639,762, mailed on Mar. 4, 2011, 5 pages.
Notice of Allowance for U.S. Appl. No. 09/988,066, mailed Oct. 30, 2008, 8 pages.
Requirement for Restriction/Election for U.S. Appl. No. 09/988,066, mailed Dec. 13, 2005, 7 pages.
Advisory Action for U.S. Appl. No. 09/988,066, mailed May 28, 2008, 4 pages.
Notice of Allowance for U.S. Appl. No. 09/988,066, Mailed Jan. 9, 2009, 13 pages.

(56) References Cited

OTHER PUBLICATIONS

Non Final Office Action U.S. Appl. No. 11/804,977, mailed Jan. 14, 2008, 13 pages.
Notice of Allowance for U.S. Appl. No. 11/804,977, mailed Nov. 19, 2008, 17 pages.
Non-Final Office Action for U.S. Appl. No. 12/400,594, mailed on May 14, 2010, 19 pages.
Final Office Action for U.S. Appl. No. 12/400,594, mailed on Oct. 28, 2010, 9 pages.
Notice of Allowance for U.S. Appl. No. 12/400,594, mailed on Mar. 23, 2011, 8 pages.
Non-Final Office for U.S. Appl. No. 12/400,645, mailed on Sep. 1, 2010, 8 pages.
Notice of Allowance for U.S. Appl. No. 12/400,645, mailed on Jan. 26, 2011, 12 pages.
Non-Final Office Action for U.S. Appl. No. 12/372,390, mailed on Apr. 22, 2010, 12 pages.
Non-Final Office Action for U.S. Appl. No. 12/372,390, mailed on Sep. 13, 2010, 6 pages.
Notice of Allowance for U.S. Appl. No. 12/372,390, mailed on Mar. 9, 2011, 5 pages.
Non-Final Office Action for U.S. Appl. No. 09/855,015, mailed Oct. 28, 2004, 12 pages.
Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Non-Final Office Action for U.S. Appl. No. 12/505,390, mailed on Oct. 28, 2010, 16 pages.
Notice of Allowance for U.S. Appl. No. 09/855,015, mailed Jan. 7, 2008, 8 pages.
Supplemental Notice of Allowance for U.S. Appl. No. 09/855,015, mailed Feb. 4, 2008, 18 pages.
Non-Final Office Action for U.S. Appl. No. 13/083,481, mailed on Dec. 1, 2011, 7 pages.
Requirement for Restriction/Election for U.S. Appl. No. 09/855,015, mailed Nov. 3, 2006, 6 pages.
Non-Final Office Action for U.S. Appl. No. 12/070,893, mailed on Jun. 10, 2010, 9 pages.
Final Office Action for U.S. Appl. No. 12/070,893, mailed on Nov. 24, 2010, 8 pages.
Non-Final Office Action for U.S. Appl. No. 12/070,893, mailed on Mar. 18, 2011, 6 pages.
Final Office Action for U.S. Appl. No. 12/070,893, mailed on Sep. 21, 2011, 12 pages.
Requirement for Restriction/Election for U.S. Appl. No. 12/466,277, mailed on Aug. 9, 2011, 6 pages.
Notice of Allowance for U.S. Appl. No. 12/466,277, mailed on Nov. 2, 2011, 47 pages.
Non-Final Office Action for U.S. Appl. No. 12/684,022 mailed Jul. 30, 2012, 18 pages.
Non-Final Office Action for U.S. Appl. No. 11/611,067, mailed Feb. 20, 2009, 11 pages.
Final Office Action for U.S. Appl. No. 11/611,067, mailed on Oct. 16, 2009, 8 pages.
Non-Final Office Action for U.S. Appl. No. 11/611,067, mailed on Dec. 8, 2009, 8 pages.
Non-Final Office Action for U.S. Appl. No. 11/615,769, mailed Apr. 15, 2009, 11 pages.
Final Office Action for U.S. Appl. No. 11/615,769, mailed on Jan. 22, 2010, 7 pages.
Advisory Action for U.S. Appl. No. 11/615,769, mailed on May 25, 2010, 3 pages.
Notice of Allowance for U.S. Appl. No. 11/615,769, mailed on Jul. 12, 2010, 8 pages.
Notice of Allowance for U.S. Appl. No. 11/779,714, mailed on Jun. 18, 2012, 7 pages.
Final Office Action for U.S. Appl. No. 12/198,710 mailed on Mar. 21, 2013, 17 pages.
Non-Final Office Action for U.S. Appl. No. 13/083,481 mailed on Mar. 1, 2013, 14 pages.
Notice of Allowance for U.S. Appl. No. 10/810,301, mailed Jul. 28, 2006, 5 pages.
Non-Final Office Action for U.S. Appl. No. 11/745,008 mailed on Mar. 7, 2013, 18 pages.
Non-Final Office Action for U.S. Appl. No. 13/548,116 mailed on Apr. 15, 2013, 8 pages.
Non-Final Office Action for U.S. Appl. No. 12/900,279 mailed on Apr. 11, 2013, 7 pages.
Non-Final Office Action for U.S. Appl. No. 12/608,985 mailed on May 31, 2013, 9 pages.
Notice of Allowance for U.S. Appl. No. 12/198,710 mailed on May 28, 2013, 10 pages.
Non-Final Office Action for U.S. Appl. No. 13/398,725 mailed on Aug. 30, 2013, 8 pages.
Notice of Allowance for U.S. Appl. No. 12/684,022 mailed on Aug. 20, 2013, 10 pages.
Notice of Allowance for U.S. Appl. No. 13/083,481 mailed on Sep. 3, 2013, 9 pages.
Non-Final Office Action for U.S. Appl. No. 10/832,086 mailed on Sep. 9, 2013, 13 pages.
Non-Final Office Action for U.S. Appl. No. 12/608,972 mailed on Sep. 16, 2013, 6 pages.
Non-Final Office Action for U.S. Appl. No. 13/458,650 mailed on Oct. 2, 2013, 5 pages.
Notice of Allowance for U.S. Appl. No. 11/745,008 mailed on Oct. 7, 2013, 9 pages.
U.S. Appl. No. 14/082,546, filed Nov. 18, 2013 by Jha et al. (Unpublished).
U.S. Appl. No. 14/075,331, filed Nov. 8, 2013 by Patel et al. (Unpublished).
Final Office Action for U.S. Appl. No. 12/624,300 mailed on Oct. 31, 2013, 16 pages.
Final Office Action for U.S. Appl. No. 12/900,279 mailed on Sep. 27, 2013, 8 pages.
Final Office Action for U.S. Appl. No. 13/548,116 mailed on Nov. 7, 2013, 19 pages.
Notice of Allowance for U.S. Appl. No. 12/608,985 mailed on Dec. 24, 2013, 7 pages.
Final Office Action for U.S. Appl. No. 12/608,972 mailed on Jan. 17, 2014, 5 pages.
Notice of Allowance for U.S. Appl. No. 14/075,331 mailed on Nov. 12, 2014, 10 pages.
Non-Final Office Action for U.S. Appl. No. 14/075,331 mailed on Aug. 15, 2014, 17 pages.
Non-Final Office Action for U.S. Appl. No. 13/939,730 mailed on Sep. 25, 2014, 11 pages.
Non-Final Office Action for U.S. Appl. No. 13/925,564 mailed on Oct. 3, 2014, 9 pages.
U.S. Appl. No. 14/326,859, filed Jul. 17, 2014 by Wong. (Unpublished).
Final Office Action for U.S. Appl. No. 12/624,300 mailed on Jun. 27, 2014, 15 pages.
Notice of Allowance for U.S. Appl. No. 13/398,725 mailed on Jun. 24, 2014, 7 pages.
Final Office Action for U.S. Appl. No. 13/485,650 mailed on Jul. 17, 2014, 10 pages.
Final Office Action for U.S. Appl. No. 13/398,725 mailed on Mar. 13, 2014, 10 pages.
Notice of Allowance for U.S. Appl. No. 10/832,086 mailed on Mar. 14, 2014 5 pages.
Notice of Allowance for U.S. Appl. No. 12/608,972 mailed on Apr. 9, 2014, 7 pages.
Non-Final Office Action for U.S. Appl. No. 13/548,116 mailed on Jun. 6, 2014, 20 pages.
U.S. Appl. No. 14/277,889, filed Dec. 19, 2014 by Davis et al. (Unpublished).
Final Office Action for U.S. Appl. No. 13/925,564 mailed on Apr. 29, 2015, 6 pages.
Notice of Allowance for U.S. Appl. No. 13/766,330 mailed on May 5, 2015, 5 pages.

(56) References Cited

OTHER PUBLICATIONS

Non-Final Office Action for U.S. Appl. No. 12/624,300 mailed on May 15, 2015, 6 pages.
Notice of Allowance for U.S. Appl. No. 14/082,546 mailed on Jun. 8, 2015, 10 pages.
Notice of Allowance for U.S. Appl. No. 13/548,116 mailed on Jan. 13, 2015, 14 pages.
Non-Final Office Action for U.S. Appl. No. 14/082,546 mailed on Jan. 22, 2015, 9 pages.
Non-Final Office Action for U.S. Appl. No. 13/766,330 mailed on Jan. 28, 2015, 9 pages.
Notice of Allowance for U.S. Appl. No. 13/939,730 mailed on Feb. 27, 2015, 9 pages.
Final Office Action for U.S. Appl. No. 12/624,300 mailed on Nov. 17, 2015, 14 pages.
Non-Final Office Action for U.S. Appl. No. 14/326,859 mailed on Nov. 24, 2015, 7 pages.
Notice of Allowance for U.S. Appl. No. 13/925,564, mailed on Jan. 11, 2016, 10 pages.

* cited by examiner

HITLESS SOFTWARE UPGRADES

CROSS-REFERENCES TO RELATED APPLICATIONS

This application is a divisional application of, and claims priority to, U.S. patent application Ser. No. 11/646,845, now U.S. Pat. No. 8,448,162, filed Dec. 27, 2006, entitled "Hitless Software Upgrades," which claims priority to U.S. Provisional Application No. 60/754,932, filed Dec. 28, 2005, and U.S. Provisional Application No. 60/762,283, filed Jan. 25, 2006, the entire contents of each of which are herein incorporated by reference for all purposes.

This application is related to U.S. Provisional Application No. 60/754,739, filed Dec. 28, 2005, and to U.S. patent application Ser. No. 11/586,991, now abandoned, filed Oct. 25, 2006, both of which are incorporated by reference in their entirety for all purposes.

BACKGROUND

The present invention relates generally to computer networks and specifically to failover or redundancy in network equipment.

The OSI model developed by the International Organization for Standards (ISO) serves a guideline for developing standards for data communication. Different pieces of network equipment are governed by these standards and allows for the interconnection of various network equipment.

The OSI, or Open System Interconnection, model defines a networking framework for implementing protocols in seven layers. Control is passed from one layer to the next, starting at the application layer in one station, proceeding to the bottom layer, over the channel to the next station and back up the hierarchy. The seven layers (L1 to L7) are briefly summarized as follows:

a. Application (Layer 7)—This layer supports application and end-user processes. Communication partners are identified, quality of service is identified, user authentication and privacy are considered, and any constraints on data syntax are identified. This layer provides application services for file transfers, e-mail, and other network software services.

b. Presentation (Layer 6)—This layer provides independence from differences in data representation (e.g., encryption) by translating from application to network format, and vice versa. The presentation layer works to transform data into the form that the application layer can accept.

c. Session (Layer 5)—This layer establishes, manages, and terminates connections between applications. The session layer sets up, coordinates, and terminates conversations, exchanges, and dialogues between the applications at each end.

d. Transport (Layer 4)—This layer provides transparent transfer of data between end systems, or hosts, and is responsible for end-to-end error recovery and flow control. It ensures complete data transfer.

e. Network (Layer 3)—This layer provides switching and routing technologies, creating logical paths, known as virtual circuits, for transmitting data from node to node. Routing and forwarding are functions of this layer, as well as addressing, internetworking, error handling, congestion control and packet sequencing.

f. Data Link (Layer 2)—At this layer, data packets are encoded and decoded into bits. It furnishes transmission protocol knowledge and management and handles errors in the physical layer, flow control and frame synchronization. The data link layer is divided into two sublayers: The Media Access Control (MAC) layer and the Logical Link Control (LLC) layer. The MAC sublayer controls how a computer on the network gains access to the data and permission to transmit it. The LLC layer controls frame synchronization, flow control and error checking g. Physical (Layer 1)—This layer conveys the bit stream—electrical impulse, light or radio signal—through the network at the electrical and mechanical level. It provides the hardware means of sending and receiving data on a carrier, including defining cables, cards and physical aspects. Fast Ethernet, RS232, and ATM are protocols with physical layer components.

Network data switching equipment, such as that equipment used for switching or routing of information packets between network devices, handle data at the lower layers of the OSI model, while application level programs handle data at the higher OSI layers. It is desirable for network switching equipment to remain in operational condition for continuous periods of time.

A common administrative activity is the installation of new software or software modules. In most installations, it is desirable to avoid or at least minimize the impact of bringing down the system for such tasks. Whereas halting a higher level application for a software upgrade activity typically affects only the user or users of the application, halting operation of network switching equipment can impact a larger community of users, indeed possibly the entire enterprise. Software updates to applications are relatively easy to do because only a relatively limited number of users are usually affected. By comparison, the downtime that may result from performing software updates to network switching equipment could affect an entire enterprise.

BRIEF SUMMARY

Embodiments of the present invention provide techniques for facilitating software upgrade for a system such as a switching system or router.

According to an embodiment of the present invention, techniques are provided for facilitating software upgrade for a switching system in a hitless manner.

According to an embodiment of the present invention, techniques are provided for facilitating software upgrade for a switching system comprising a first management processor and a second management processor, the techniques comprising receiving a signal to perform a software upgrade for the first management processor, and performing a software upgrade for the first management processor without substantially affecting packet switching performed by the switching system.

DETAILED DESCRIPTION

In the descriptions to follow, specific details for the purposes of explanation are set forth in order to provide a thorough understanding of the invention. However, it will be apparent that the invention may be practiced without these specific details. For example, the embodiment described below makes reference to the BigIron® Series product from Foundry Networks, Inc. However, this is not intended to limit the scope of the present invention. The teachings of the present invention are also applicable to other boxes, devices, routers, switching systems, and data processing systems.

Figure 1:
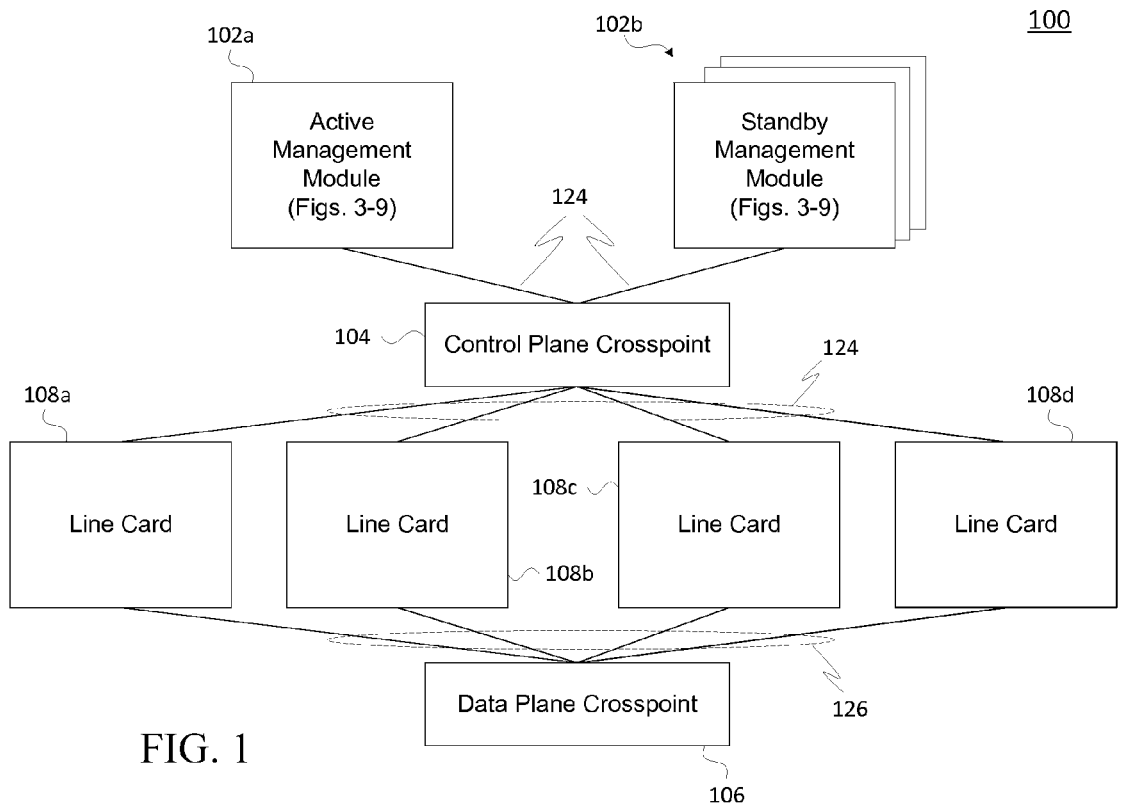
FIG. 1 shows a high level block diagram of a network device according to an embodiment of the present invention.

FIG. 1 shows a high level block diagram of a network switching device 100 according to the present invention. In this embodiment, the network switching device 100 provides processing of data packets in Layer 1, Layer 2, and Layer 3 of the OSI model.

The network switching device 100 includes a processor 102*a* designated as the active management processor (active MP), or active management module. It will be appreciated that the processor 102*a* includes functional components such as a data processing unit, various memory components, control logic, driver circuits for interfacing with other elements of the network switching device 100, and interface circuits for remote access (e.g., by an administrator).

A user, typically an authorized system administrator, can interact with the network switching device 100 via the active management module 102*a*. The user can configure the other components of the network switching device 100, or otherwise inspect various data structures and machine states of the device, via the active management module 102*a*. The user can also perform software updates operations on the various components described below.

The active management module 102*a* is configured to provide a suitable user interface (e.g., command line interface, CLI) that allows the user to interact with the management module. The user can log onto the active management module 102*a* by way of a terminal that is connected to a maintenance port on the active management module, or some similar kind of port. Alternatively, the active management module 102*a* may be configured to provide the user with telnet access. It will be appreciated that the "user" can be a machine user; for example, a higher level management machine might be provided to management a large pool of network switching devices 100. In such a configuration, a suitable machine interface can be provided.

FIG. 1 shows that the network switching device 100 includes one or more additional processors 102*b* designated as standby management processors (standby MP), or standby management modules. It is understood that the network switching device may provide a single standby management module, or a plurality of such modules as illustrated in FIG. 1. As will be explained in greater detail below, any one of the standby management module(s) 102*b* can take over the operation of the active management module 102*a* if the latter becomes inactive for some reason. The management modules may be collectively referred to herein by the reference numeral 102 for convenience, and will be understood to refer to the active management module 102*a* and the standby management module(s) 102*b*.

FIG. 1 shows a plurality of linecard modules 108*a*-108*d* which may be collectively referred to herein by the reference numeral 108. Although the figure shows four such line cards, it is understood the fewer or more line cards can be provided, depending on the particular configuration of a given network switching device. Each linecard module 108*a*-108*d* is configured to be connected to one or more devices (not shown) to receive incoming data packets from devices connected to it and to deliver outgoing data packets to another device connected to the linecard module or connected to another linecard module.

A connection plane referred to herein as control plane crosspoint 104 serves to interconnect the linecard modules 108 via their respective control lines, identified in the figure generally by the reference numeral 124. Control lines 124 from the management modules 102 also connect to the control plane 104. The control plane 104 routes control traffic among the linecard modules 108 and the management modules 102 in order to maintain proper route destinations among the linecard modules, ensure network convergence, and so on. In accordance with the present invention, both the active management module 102*a* and the standby management module(s) 102*b* receive control traffic.

A connection plane referred to herein as data plane crosspoint 106 serves to interconnect the linecard modules 108 via their respective data paths, identified in the figure generally by the reference numeral 126. The data plane 106 allows data packet traffic received from a source connected to one linecard module to be routed to destination that is connected to another linecard module. Of course, the source of the data traffic and the destination may be connected to the same linecard module.

Figure 2:
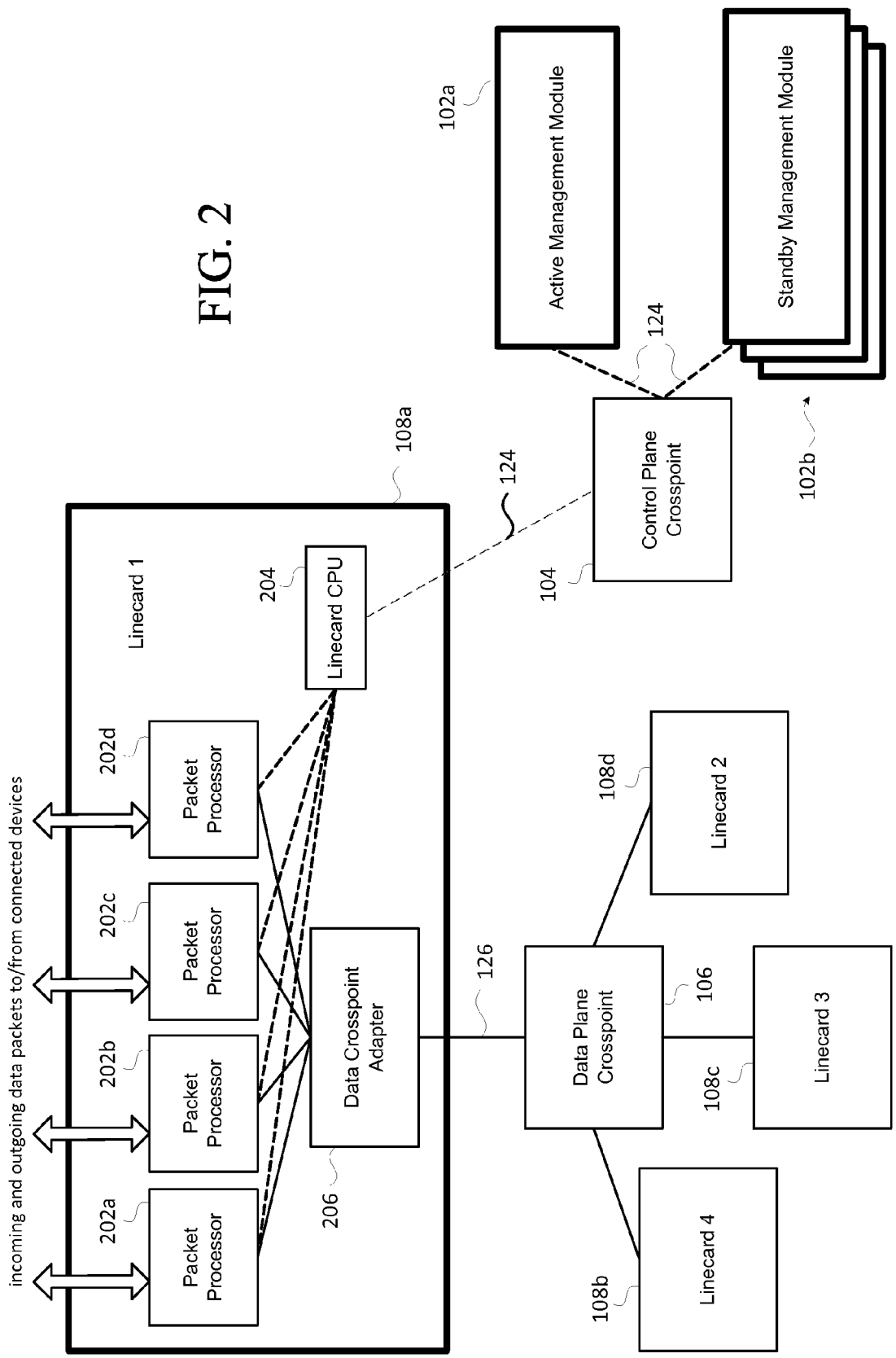
FIG. 2 shows further detail of a linecard module.

Refer now to FIG. 2 for a discussion of additional details of the linecard module 108*a* shown in FIG. 1. Elements common to FIGS. 1 and 2 are identified by the same reference numerals. The linecard module 108*a* includes some number of packet processors 202*a*-202*d*, collectively referred to herein by the reference numeral 202. Each packet processor is configured with a physical port connector, schematically represented in FIG. 2 by the double arrows, for incoming and outgoing data packets. The physical port connector provides connectivity to an end station (e.g., a personal computer) and to another piece of network equipment (e.g., router, bridge, etc.). The physical port connector can be a single connector (full duplex communication) or a pair of connectors (input and output).

The linecard module 108*a* further includes a data adapter 206 that is configured for connection to the packet processors 202 via data paths between the packet processors and the data adapter. The data adapter 206 is further configured for connection to the data plane 106. In this way, the linecard modules 108 can be connected to each other via corresponding data paths 126 to provide interconnectivity among the linecard modules. For example, in a typical implementation, a chassis can house some number of linecard modules. The chassis includes a backplane which has a plurality of connectors into which the linecard modules can be plugged. In this configuration, the data paths 126 would include the connection between data pins on the adapter 206 of one of the linecard modules and one of the backplane connectors.

The linecard module 108a further includes a linecard processor (LP) 204. The linecard processor 204 is connected to the packet processors 202 via corresponding control lines. The linecard processor 204 is also connected to the control plane 104 via the control line 124. The other linecard modules 108b-108d are similarly connected to the control plane 104. This allows for control/status information that is generated by the linecard modules 108 to be transmitted to the active management module 102a. Conversely, the active management module 102a can communicate control/status information it receives from the linecard modules 108 to any one or more of the other linecard modules.

Various processes and tasks execute as programs on the linecard processor 204 and in the packet processors 202, some of which will be discussed below. These processors comprise components such a data processor or microcontroller, memory (RAM, ROM), data storage devices, and suitable support logic in order store, load, and execute these programs.

In accordance with the present invention, the standby management module(s) 102b are connected to the control plane 104. This connection allows for the active management module 102a to transmit suitable information to the standby management module(s) 102b, and for the linecard modules to transmit suitable information to the standby management module(s) during operation of the system.

Following is a discussion of operation of the management processors 102 and linecard processors 204 in accordance with the present invention when software upgrades are made. Software upgrade processing is incorporated at system start up. Upgrade processing functionality includes similar functionality as described for failover switchover sequencing disclosed in the commonly owned application identified above ("hitless failover management").

The acronym MP (management processor) will be used to refer to the management modules 102 shown in FIGS. 1 and 2. To avoid awkward sentence structures, the following discussion will assume a system having one standby management module 102b, with the understanding that the same operations described for the one standby management module would be performed by each such module in a configuration having multiple standby management modules. The term "active MP" will be understood to refer to the active management processor 102a, and "standby MP" will be understood to refer to the standby management processor 102b. Similarly, the acronym LP (linecard processor) will be used to refer to one or more linecard processors, depending on context.

First, a brief discussion of the start up sequence in the MPs will be given. This is followed by a brief description of switchover processing when the active MP experiences a failure. This will provide a backdrop against which to discuss aspects of the present invention.

A. Start-Up Sequence

1. Arbitration

When the network switching device 100 boots up (i.e., at power up, after a reset, etc.), MP active/standby arbitration is first performed in the monitor. Both processors begin executing, one processor becomes the active MP, the other processor becomes the standby MP. The process of MP active/standby arbitration is the method by which this determination is made. Typically, this is implemented using known hardware semaphore techniques, where each processor attempts to access the hardware semaphore. Only one processor will succeed; that processor designates itself as the active MP while the other processor designates itself as the standby MP. Alternatively, each processor can be configured by the user to be the active MP or a standby MP.

After MP active/standby arbitration is completed, the standby MP synchronizes its flash memory and boot images to the active MP (discussed below). After the synchronization, the standby MP loads the appropriate application image based on an instruction from the active MP (it may reset itself first if a new monitor or boot image is synced).

When the standby MP is ready to start its applications, MP active/standby arbitration is performed again. This second arbitration is performed to guard against the situation where the active MP resets or is removed after the first arbitration, but before the standby MP has a chance to install its interrupt service routine. In such a situation where the active MP was not available, the standby MP would then become the active MP. If the standby MP remains standby after this second arbitration, it then installs its ISR (interrupt service routine) and functions as a standby MP until an MP switchover interrupt occurs.

2. Active MP Operation

The active MP performs flash and boot image synchronization through a task executing on the active MP referred to as scp_task. The active MP reads in a startup configuration file and parses through the file. The configuration file can be stored in some form of programmable non-volatile memory, or on a disk drive. The active MP then synchronizes the standby MP with the configuration information (the running configuration), so that both the active MP and the standby MP have the same running configuration; i.e., the active MP sends over to the standby MP the running configuration. The scp_task will not reply to the standby MP until the startup configuration file is parsed by the active MP.

While the process of synchronizing the running configuration is in progress, CLI (command line interface), WEB, and SNMP inputs on the active MP are disabled until the standby MP is ready. This is to prevent the configuration state of the active MP from getting too far ahead of the standby MP due to configuration update information that can be received from users or linecard modules during the synchronization activity. When the running configuration is synchronized to the standby MP (i.e., the standby MP has the same configuration as the active MP), then the CLI, WEB, and SNMP interfaces can be executed on the active MP. Alternatively, it might be possible to allow these interfaces to run on the active MP, but simply queue up any input to be subsequently synchronized to the standby MP.

3. Standby MP Operation

After two arbitrations, the standby MP first starts a timer task called timer_task and a listener task called mp_rx_task. During normal startup processing standby MP then starts a task called redundancy_task, which performs a First Phase Software States synchronization operation. The First Phase Software States are the software states that are to be synchronized with the active MP before any other tasks are started. These states constitute the baseline software state in the standby MP. They include, for example, the running configuration, the CLI session modes, and in general the software states of any tasks that will execute on the standby MP.

After this baseline synchronization completes, the standby MP starts all other tasks. The synchronized running configuration (i.e., the running configuration sent over from the active MP) will be parsed when a task called the console_task is started. The standby MP will not initialize any of the hardware such as the linecard modules 108, and during operation of the system will drop all outgoing IPC packets it receives.

The scp task that runs on the standby MP views all slots as empty. This prevents the standby MP from running the card state machine and the port state machine. On the active MP, these state machines serve to keep track of the status of the linecard modules and the ports on the linecard modules during operation of system. Consequently, state changes in the linecard modules 108 and state changes in the ports of the linecard modules will not trigger an update by the standby MP, whereas updates will occur in the active MP since the card and port state machines do execute in the active MP.

However, in order to support upper layer components that may require the correct view of card and/or port states, the card and port states are synchronized between active and standby MPs. Thus, with reference to FIG. 3A, when a linecard module 108 experiences a change in its state or a change in state in one of its ports (step 312), the linecard module informs the active MP (step 314) of the state change. The active MP updates its internal data structures (i.e., the card or port state machine) to reflect the state change in the linecard, step 316. The active MP also syncs that state information to the standby MP (i.e., sends the state information to the standby MP), step 318. Thus, even though the standby MP is not actively communicating with the linecard modules, it is kept apprised of their state changes via the active MP.

B. Switchover Behavior

When the active MP resets (e.g., because it crashed, the processor locked up and a watchdog timer reset the processor, a user initiated the reset, etc.) an MP switchover happens and the standby MP will become the "newly active MP" upon completion of the MP switchover process.

Figure 3B:
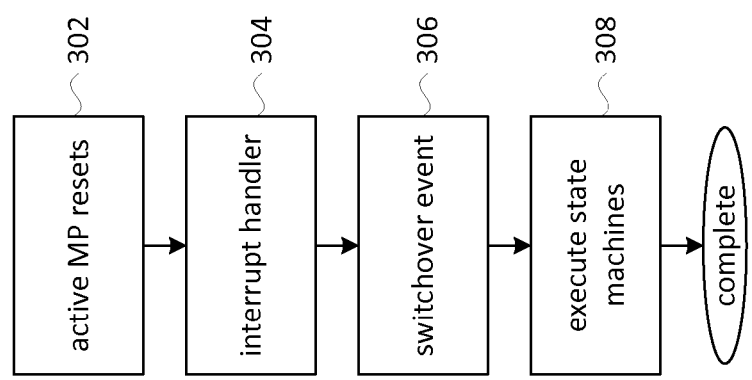
FIG. 3B illustrates switchover processing according to the present invention.
Figure 3A:
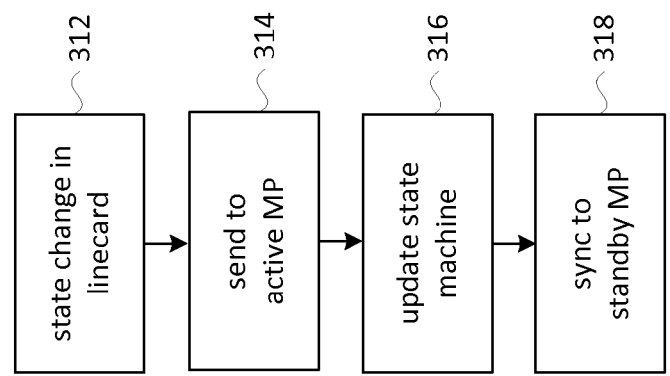
FIG. 3A illustrates sync processing of linecard state information according to the present invention.

Referring to FIG. 3B, the switchover process begins when the active MP resets and generates an interrupt, step 302. The interrupt is a common example of a mechanism that allows the standby MP to detect the occurrence of a reset in the active MP. It will be appreciated that other detection mechanisms can be employed. The ISR of the standby MP is entered and executed as a result of receiving the interrupt, step 304. The ISR sends an ITC (inter task communication) message to the standby MP's redundancy_task, step 306. The redundancy_task in turn performs the necessary hardware access to send out an "MP Switchover" event before the task exits.

The scp_task in the standby MP registers for the "MP Switchover" event, and upon detecting the event, runs the card state machine to perform hot-switchover, step 308. In the case that the standby MP is synchronized with the active MP before the latter crashed, this action will have no effect on the linecard modules 108. However, in the event that the active MP crashed before it had a chance to synchronize the current card states and port states to the standby MP, then the MP's would be out of sync with respect to the linecard module states at the time the active MP reset. Running the card state machine in this case guarantees that the linecard modules 108 are in a state that the newly active MP thinks they should be in.

1. Card and Port State Machines During MP Switchover

Figure 4:
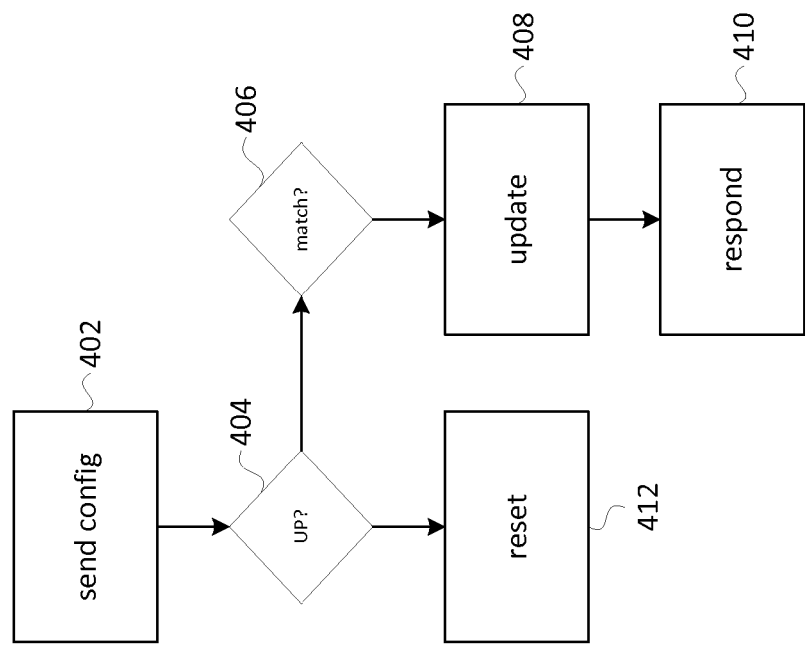
FIG. 4 illustrates line card processing during switchover processing.

As mentioned before, the standby MP views all slots empty. This prevents card and port state machines from running. When the scp_task receives the "MP Switchover" event, it changes all non-empty and non-powered-off slots to a "Recovery" state. FIG. 4 illustrates the processing that takes place in the linecard modules 108. It is noted that the following steps can be performed by suitably configured program code executing in the linecard processor 204 of the linecard module receiving the information.

In the "Recovery" state, the standby MP sends card configurations to each the linecard modules 108 with an indication that it is due to MP switchover, step 402. If a given linecard module is in an "Up" state, it compares the received configurations against its cached configurations, steps 404, 406. If anything is missing from its cached configurations, it re-applies it, step 408. The linecard module then sends its card operational information to the standby MP, step 410. If the linecard module is not in the "Up" state, it resets itself, step 412. The transition from the "Recovery" state to the "Up" state bypasses switch fabric programming, and thus incurs no traffic hits. When a linecard module reaches the "Up" state, its ports kick off the port state machine.

Some upper layer components may want to run on the standby MP in exactly the same way as they did on the active MP. In this case, these upper layer components may require the correct view of cards and ports, as well as card and port up/down events. To facilitate this requirement, the up/down state of the linecard modules and their respective ports are synchronized to the standby MP, and a new set of card and port up/down events are provided. The set of events which the upper layer components can register for include:

EVENT_ID_MP_RED_CARD_UP=23,
EVENT_ID_MP_RED_CARD_DOWN=24,
EVENT_ID_MP_RED_PORT_UP=25,
EVENT_ID_MP_RED_PORT_DOWN=26,
EVENT_ID_MP_RED_PORT_DOWN_COMPLETE=27,
EVENT_ID_MP_RED_PORTS_UP=28,
EVENT_ID_MP_RED_PORTS_DOWN=29,
EVENT_ID_MP_RED_PORTS_DOWN_COMPLETE

2. Upper Layer Components can Register for these Events.

After MP switchover completes, the linecard modules 108 report their card and port states through the "Recovery" state machine mechanism discussed above. These states may potentially conflict with those synchronized before the switchover. The consequences could be the missing of "Down" events (by default, all port states are down). To avoid this, after "Recovery" state machine completes, and when all ports have reached their final states, a new event "Port State Ready" is sent. Thus, referring to FIG. 4, step 410 would include sending the "Port State Ready" event. All upper layer components registering for the new set of card/port up/down events can also register for this one. Upon receiving a registered event, the upper layer component can check the card and port states using suitable HAL APIs (hardware abstraction layer, which is used on the management console to abstract the underlying system hardware).

C. Execution Flow for Software Upgrades

Figure 11B:
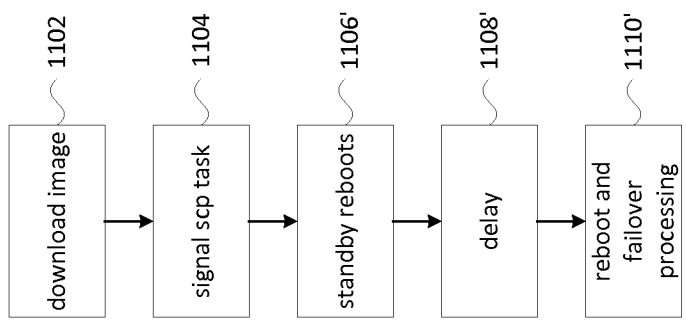
FIGS. 11A and 11B illustrate high level flows for software upgrades in the MP according to the present invention.
Figure 11A:
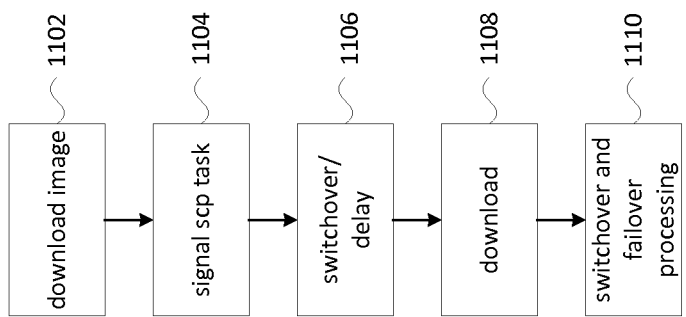

FIGS. 11A and 11B illustrate two embodiments of the present invention showing the basic flow of events when a software upgrade must be performed on a "live" system. In the first embodiment shown in FIG. 11A, the software upgrade procedure starts from the CLI (command line interface) where a user, typically an administrator, downloads (step 1102) one or more new software components (commonly referred to as "binary images" or simply "images") to the specified MP and/or LP destinations, depending on which components are being upgraded; i.e., just the MPs, any one of the LPs, or just some of the LPs. Typically all LPs are upgraded, but the present invention does not require that all LPs be upgraded and allows for the possibility that some LP's and not other LP's might be upgraded. For example, LP's with different hardware might be upgraded at different times with different software.

If the image download is successful, the next phase (step 1104), i.e., the hitless upgrade phase, starts by sending an ITC (inter task communication) request message to an scp task in the active MP. From there on until the upgrade is completed or aborted, the CLI is not accessible by the users. The scp task runs a state machine to monitor the upgrade process. To facilitate the description, we assume that we have 2 MPs, MP1 and MP2. When the upgrade process starts, MP1 is the active MP and MP2 is the standby MP.

First, the active (MP1) sends the upgrade information to the standby (MP2) by way of an upgrade request message, step 1106. Upon receiving the ACK, the active MP (MP1) performs a switchover process, boots with the image specified by MP_BOOT_SRC and becomes the new standby MP. Note that this switchover differs from the switchover discussed above in that the newly active MP does not perform a synchronization of its image with that of the previously active MP. The reason, of course, is that the previously active MP contains the old image. Continuing with FIG. 11A, the previous standby (MP2) now becomes the active MP. Upon noticing the new standby MP (MP1) is ready, the newly active MP (MP2) starts a timer to wait for an additional amount of time (e.g., 1 min) to allow the new standby MP (MP1) to stabilize its protocols. Upon the timeout, the new active MP (MP2) sends the upgrade information to the new standby (MP1), step 1108. Upon receiving the ACK, the active (MP2) performs another switchover (step 1110), boots with the image specified in MP_BOOT_SRC and once again becomes the standby MP, and the standby MP (MP1) becomes the active MP. After these two switchovers, the MPs are running the upgraded images. The second switchover (step 1110) includes performing failover processing. In particular, the failover processing according to the invention disclosed in the commonly owned patent application identified above is performed.

FIG. 11B shows an alternative embodiment. As in FIG. 11A, the administrator downloads the image to the active MP in step 1102. Assuming the image is successfully downloaded, the active (MP1) sends the upgrade request to the standby (MP2), step 1104. Upon receiving the request, the standby (MP2) reboots with the new image indicated in the request, step 1106'. The standby (MP2) comes up as standby without synching to the active MP's running image. After the standby (MP2) reboots and comes up again as standby, the active (MP1) waits for an amount of time (e.g., 1 minute) for the standby (MP2) to stabilize its protocols, step 1108'. The active (MP1) then reboots itself with the new images (step 1110) and performs MP fail-over processing. It then comes up as the active MP. Both MPs are running the new images. The failover processing in step 110 is performed according to the invention disclosed in the commonly owned, patent application identified above.

A discussion of failover processing is provided herein for completeness and is presented below in connection with FIGS. 4 to 10. The discussion which immediately follows, however, will turn to processing in the LP with regard to software upgrades per the present invention.

FIGS. 11A and 11B discussed above illustrate the basic flow for software upgrades in the MP. However, the LPs also include software components which occasionally require upgrading. In the case where both the MPs and the LPs need to be upgraded, then the processing according to FIG. 11A or FIG. 11B will be performed first. That is, upgrades are first performed in the MP. Then the LPs are upgraded as discussed below. If only the MP needs a software upgrade, then of course the discussion ends here. If only the LP needs a software upgrade, then the processing outlined in FIGS. 11A and 11B are not performed, and only the processing to be discussed next is performed.

Figure 12:
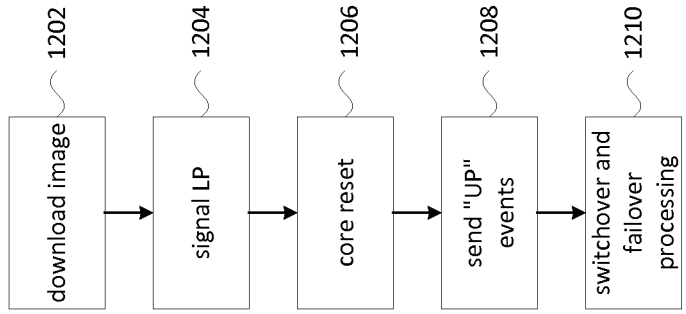
FIG. 12 illustrates a high level flow for software upgrades in the LP according to the present invention.

Referring to FIG. 12, an overview of the LP upgrade process will now be discussed. The LP upgrade procedure starts with the user, typically via the CLI, downloading an LP image(s) to the active MP, step 1202. In a step 1204, the active MP sends an upgrade message to the LPs to be upgraded; the upgrade message includes the image. Each LP that receives the upgrade message performs a core reset, step 1206. This is a reset which affects only the processor core.

When LP boot starts, it skips the memory controller initialization. When the monitor is loaded, it skips the backplane gigalink initialization. It then boots normally until the LP application is loaded. The MP will skip the flash image synchronization check. When the LP application is loaded, it will populate its software structures while blocking the access to the HW components during LP initialization, module configuration, and port configuration.

The MP will not send card down and port down events when LPs perform a core reset. When the LPs boot up with the upgraded images, the MP will send out card up and port up events, step 1208. Upon receiving card up and port up events, other SW components should discard its previous knowledge about LP state (i.e., LP is up from their point of views), and behave as if the LP is hot-inserted, and populate corresponding LP data structures.

1. Linecard Upgrade Events

The system code provides a number of events associated with the LP (linecard) software upgrade that various tasks on the MP (management module) can register to receive.

a. LP Upgrade Start

This event will be triggered when the LP upgrade command is received from the user. This allows all registered entities to be able to save any important information that needs to be preserved across the LP reset. Only after applications are done with handling this event, will the LP reset be sent to the linecard. Once this event is received, every registered entity should prepare for the situation when the connection to the LP is down. For L2 protocols, this could mean that the timers are frozen (e.g., to prevent reconvergence of the protocol).

b. LP Upgrade Done

Once the application code on the linecard is fully operational, an LP upgrade done event is generated. This will allow all registered entities to start operating normally.

2. MAC Table

Before the LP upgrade begins, the hardware MAC table information is stored into a protected portion of memory. After the LP core reset, the MP synchronizes the software MAC table (exactly in the same way that the synchronization takes place on a normal reset). After this is completed, the MAC entry to hardware index association is recreated. Until this process is completed, all hardware accesses may be disabled.

3. VLAN Table and Configuration

VLAN configuration is synchronized to the LP on card up event. After an LP reset, the VLAN hardware accesses are disabled by the underlying system software. Once the LP application is up, hardware accesses are allowed. It is possible, e.g., due to a double failure, that there is a mismatch between the LP hardware configuration and the LP software configuration. The current implementation will verify the hardware and software configuration and fix any mismatch that is found. Other techniques may also be provided for recovering gracefully from double failures.

4. Protocols Configuration and Operation

The protocol configuration is synchronized to the LP when the card up event is detected on the management module. During the upgrade process, however, protocol packets need to be sent/received in order to maintain protocol stability. This is dependent on the length of the reset process and sensitivity of the protocol. For example, STP (Spanning Tree Protocol), the least sensitive of the supported protocols, will reconverge if no BPDU is received for max-age time (20 seconds). RSTP (Rapid Spanning Tree Protocol), on the other hand, will reconverge after 6 seconds. More sensitive protocols such as VSRP (Virtual Switch Redundancy Protocol, a Layer 2 protocol) and MRP (Metro Ring Protocol, a Layer 2 protocol), proprietary protocols owned by the assignee of the present invention, will converge in about 800 ms and 300 ms.

Protocols will register for all LP Upgrade Events. This section will detail the actions taken by protocols when each of the LP Upgrade Events are received.

a. LP Upgrade Start Event:
      When this event is received the following actions are performed by application entities on the MP:
         i. Packets that need to be transmitted out from the LP should be sent to the LP. The application then stores this packet in a protected portion of memory that is accessible to both the kernel and the application.
         ii. The system API will accept the packet buffer, the destination VLAN, the destination port and the transmit interval. These are stored in the protected portion in memory that is accessible to both application and kernel.
         iii. All timers associated with L2 protocol convergence or transitions should be frozen. This will prevent the master down timer for VSRP or the dead timer for MRP from expiring. Most other transitions can be continued.
      On the LP, when the reset is done the following actions are performed.
         i. When the kernel comes up after reset, it will read the packets from the protected memory and start transmitting these packets based on the programmed interval. The minimum interval is about 50 ms.
         ii. Once the LP application is loaded, the application will take over from the kernel and start transmitting these packets. It will continue to do this until the application is fully operational and ready to start transmitting packets that have been generated by the MP.
         iii. Once packets are received from the MP, the packet transmission is disabled.
   b. LP Upgrade Done Event
      On receiving the LP upgrade done event, the protocol timers will be unfrozen and the protocol operation returns to pre-upgrade conditions.

D. The User Interface

Next, is a discussion of portions of the command line interface relevant to the present invention. The software upgrade CLI (command line interface) command has the following syntax:

```
sw-upgrade tftp <ip_addr> upgrade_script
sw-upgrade slot1/slot2 upgrade_script
sw-upgrade flash upgrade_script
``` where upgrade_script is a text file containing upgrade instructions. The format of this text file uses the following keywords:

```
MP_BOOT_SRC:pri/sec;
LP_BOOT_SRC:all:pri/sec;
LP_BOOT_SRC:<slot#>[[,-]<slot#>]:pri/sec;
```

The above keywords tell the system which line card(s) needs to be upgraded, and which application images to use. In general, a typical upgrade script instructs the system where to download the new images, and which images to load when performing hitless upgrade. The following is a typical upgrade script:

```

#SW Upgrade using hot redundancy images

#SRC:tftp:192.168.138.2;
MP_MON:rmb02201b1.bin;
MP_APP:pri:rmpr02201b1.bin;
LP_MON:all:rlb02201b1.bin;
LP_APP:pri:all:rlp02201b1.bin;
MP_BOOT_SRC:pri;
LP_BOOT_SRC: pri:all;
```

The above script instructs the system to download an image called rmb02201b1.bin to the MP's monitor, an image called rmpr02201b1.bin to the MP's primary, an image called r1b02201b1.bin to all of the LPs' monitors, and an image called r1p02201b1.bin to all of the LPs' primaries. The script then instructs the system to initiate the upgrade of the MP to run from its primary image, and all LP's from their primary images.

Notes:
   a. If the keyword SRC is not specified, the source where the script is downloaded is used to image downloading.
   b. If the keyword MP_BOOT_SRC is not specified, the MP will not be upgraded (but the images are still downloaded if MP_MON or MP_APP are specified).
   c. If the keyword LP_BOOT_SRC is not specified, the LP will not be upgraded (but the images are still downloaded if LP_MON or LP_APP are specified).
   d. If no standby MP exists, or it is not in ready state, the MP upgrade is aborted.
   e. If an LP is not in up state, that particular LP will not be upgraded.

In addition to the script-based user interface for hitless upgrade, a simplified CLI command may be provided. The script-based interface is very flexible and performs image download and upgrade in one script. However, the simplified command below assumes the images have been downloaded and both MP && LP images need to be upgraded:

hitless-reload mp [primary|secondary] lp [primary|secondary].

In addition to the standard CLI, it is noted that other suitable interfaces can be provided to implement the foregoing functions. For example, the "user" can be a machine user where the interface is some form of machine interface, such as a protocol-driven interface. This may facilitate an automated upgrading system that automatically performs upgrades in large installations.

E. In-Service Software Upgrade in the LP

1. LP Processing

Upgrade processing in the MP was discussed above. Turn now to FIG. 13 which shows a communication sequence between an LP and the active MP and internal communication within the LP during software upgrade processing in the LP in accordance with the present invention. As can be seen, the timeline of events progresses downward. The events are identified by the circled reference numbers. The figure shows a single packet processor in the LP, though it will be appreciated from FIG. 2 that each LP contains a number of packet processors. Though not shown in FIG. 13, the packet processor is connected to a device.

During normal operation, the active MP will send to an LP messages, which are either handled by the LP internally or result in the LP sending data packet(s) to the packet processor for transmission to a device connected to the LP. These events are identified by 1a and 1b. If the LP application will always send a data packet out in order to maintain a "live" connection with the devices connected to the LP. The packets are sent at a rate of one packet every 100 mS. The LP application will either send data packets for processing L1-L7 (OSI model) requests or, absent any data packets, send so-called "keep-alive" packets to maintain the data connection between the LP and the connected device. If the data connection is disrupted due to idleness, then a reconnection sequence with the connected device may have to be performed to re-establish the data connection.

An upgrade event 2b may begin with a user entering a software upgrade command via the CLI user interface, specifying one or more LPs to be upgraded. A task (SCP task) in the active MP sends an upgrade event 2b to the L2 task. The L2 task in the active MP begins the upgrade process in each LP by sending a save protocol packet (event 2c) to the LP. This initiates a series of upgrade activities in the LP. The first such activity is to save certain information that is used by the LP application (event 3).

Figure 14:
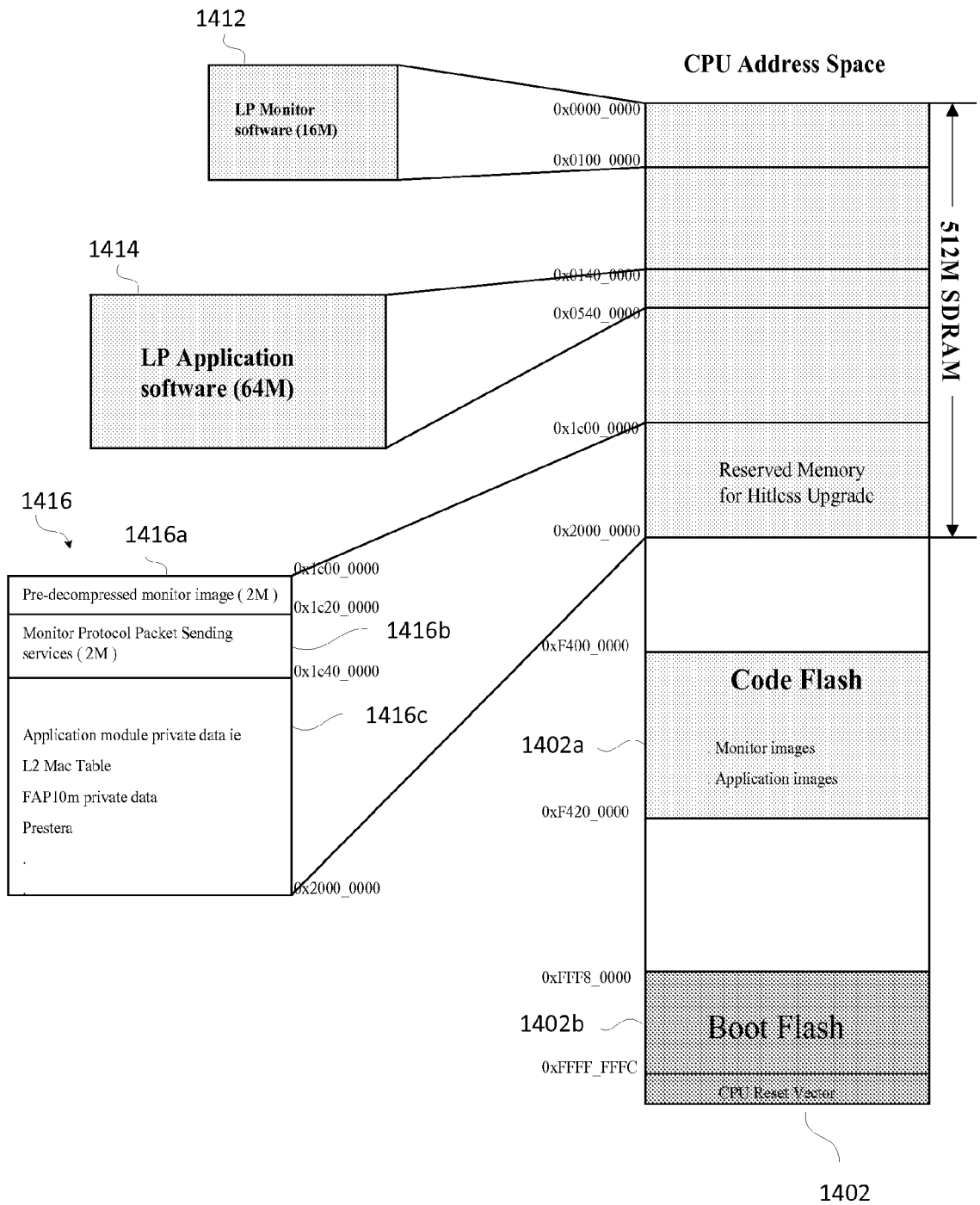
FIG. 14 shows a memory map in accordance with an illustrative embodiment of the present invention.

Turning to FIG. 14 for a moment, in order to maintain data integrity of the operational LP during a "live" software upgrade, an appropriate amount of memory is reserved to store certain live data. FIG. 14 shows the CPU memory address space 1402 of the LP's memory according to an embodiment of the present invention. In this particular embodiment, the LP's memory includes an SDRAM memory which occupies the first 512 MB (Mega-Byte, $2^{20}$ bytes) of the address space. Of that 512 MB of memory, 64 MB of reserved memory 1416 is reserved for the upgrade process of the present invention. The live LP application data from the various data structures used by the LP application is saved to a memory region 1416c of the reserved memory 1416 before software upgrade takes place. The stored data is then re-loaded into the data structures when the new application is loaded.

Returning to FIG. 13, the L2 task in the active MP also sends a message of type IPC_MSGTYPE_SW_UPGRADE_INFO at event 2d, which contains the compressed image of the new software to be installed in the LP. The LP's memory also includes a flash memory component. The compressed image is stored in another part of the CPU address space 1402 that is occupied by the flash memory device, referred to as the code flash 1402a. The are two major software components in the LP: the monitor and the application. The monitor corresponds to an operating system and provides low level access to the LP hardware (e.g., UARTs). The application provides the L1 to L7 functionality (per the OSI model) of the LP. The image that is downloaded to the LP from the active MP may either be a new monitor, a new application, or both a new monitor and a new application. Each image is stored in some area of the code flash 1402a. This process typically requires about 50 mS to complete. While event 3 is taking place, the LP application is not performing any L1 to L7 functionality. However, the application will send one (or more) "keep-alive" packets at the rate of one packet every 100 mS (event 4a) in order to refresh and devices connected to the LP in order to maintain the data connection.

At event 5, the monitor image that is stored in the code flash 1402a is decompressed and loaded into a memory space 1416a of the reserved memory 1416. This process typically requires less than 100 mS to complete. Again, during this event, the LP application is not providing L1-L7 functionality; however, one (or more) "keep-alive" packets continue to be sent by the application at a rate of one per 100 mS (event 4b).

Next, the LP application will issue a software reset request (event 6) to the currently executing monitor 1412, which resides in the top portion of the CPU address space 1402. First, an explanation of a "hard" reset (or a power-on reset) will be given.

A power-on reset or hard reset causes the LP's processing unit (CPU, microcontroller, etc., but generally referred to as the CPU) to start instruction/code execution at a fixed location (e.g., at 0xFFFF_FFFC) of the CPU address space 1402. This location is commonly referred to as the reset vector. The vector may be programmed to branch to the starting execution point of a boot image. For example, in one embodiment, a boot flash 1402b occupies a portion of the CPU address space and contains the boot image.

The reset vector points to the beginning of the boot image, and instruction execution begins from that point on. When boot image starts, various hardware components (not shown) are initialized, and certain data structures are set up. For example, the boot code will perform the following:

Configure the basic MMU memory management unit to allow access to SDRAM, processor SRAM, and both code and boot flash.

Setup exception vectors, allowing the CPU to handle unexpected exception situations.

Initialize the UART interfaces to enable console display capability.

Enable the CPU L1/L2 cache to improve initial code execution performance.

Initialize the flash file system, decompress the compressed monitor image stored in the code flash 1402 and load it into the top portion of the CPU address space 1402 as the monitor 1412.

After the monitor image is successfully loaded into SDRAM (specifically, the top portion of the CPU address space as shown in FIG. 14), code execution will be handled over from the boot image to the monitor code. The monitor does the following:

Complete the MMU initialization and set up addresses mapping for different peripheral interfaces.

Initialize peripheral interfaces, such as i2c, PCI, back plane Ethernet, local bus, and interrupt controller.

Initialize system memory pool to support memory allocation API (e.g., using malloc( )).

Initialize kernel subsystems such as system call, interrupt, multi-tasking, SDS debugger supports.

Create symbol table for monitor image.

Establish communication with MP.

Decompress the application image stored in the code Flash 1402a and store in to the that portion of the CPU address space (which is occupied by the SDRAM) as the LP application 1414.

Launch "main" task to start execution of the application.

The application provides the functionality to support L1-L7 applications and features. The decompressed application image is executed as a separate task launched by the monitor. The total amount of time the CPU spends on initial boot up and loading the monitor code into the SDRAM is around 4 seconds. The Monitor takes another 8 seconds to complete kernel initialization, and to decompress and load the application image into SDRAM. This completes the hard reset or power-on reset processing.

A software reset is a process that allows the CPU to go through the same initialization sequence as discussed above, but without resetting the CPU and all the hardware devices in the system. In accordance with the present invention, there is a "standard" software reset and "hitless" software reset.

A "standard" software reset function does the following:
Disables all interrupts in the system.
Save soft reset flag in a CPU special purpose register (e.g., User General SPR 256).
Force the CPU to restart code execution at the reset vector location (0xffff_fffc).

When CPU starts code execution at reset vector, CPU will go through the same reset process and reload all images such as boot, monitor, and application but bypass SDRAM reset and CPU memory controller initialization.

Figure 13:
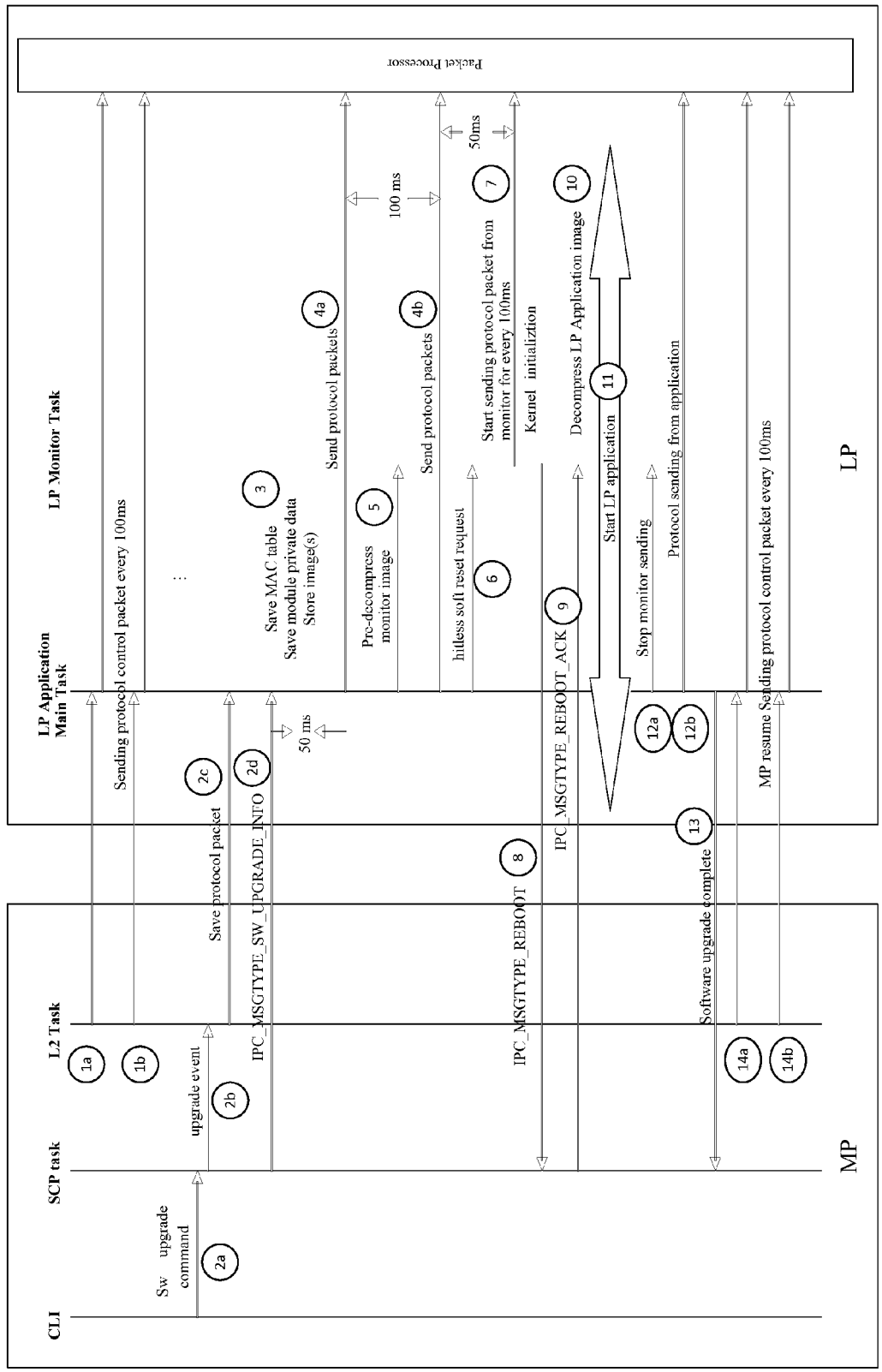
FIG. 13 illustrates various events in the LP during a software upgrades according to the present invention.

Returning to the discussion of FIG. 13, the software reset that is performed at event 6 is a "hitless" software reset. In accordance with the present invention, the hitless software reset function performs the same tasks as the "standard" software reset, with the following difference. In the "hitless" software reset scenario, the monitor does not perform the decompression processing as it would for a hard reset or for a "standard" software reset. Instead, the boot code will load the pre-decompressed monitor—i.e., perform memory copy operation(s)—stored in the area 1416*a* of the reserved memory 1416 into the portion of the CPU address space 1402 that stores the monitor code 1412. This avoids the step of decompressing, and thus improves upgrade performance.

Since the LP application is not running when a "hitless" software reset is in progress, the monitor performs a protocol sending service in accordance with the present invention. This is a software feature that allows the CPU to continue sending protocol control packets while the CPU is in the process of loading new images. According to the present invention, when the LP receives a upgrade message at event 2*d*, all pending protocols will be saved. In particular, the protocol state of a communication between the LP and each device with which the LP is performing a protocol interaction is saved in the reserve memory 1416. Thus, for any service that was required at the time a "hitless" software reset is initiated, the LP application will compose protocol packets and store them in the reserved memory 1416 before soft reset. After the monitor code starts, the protocol sending service software stored in a region 1416*b* of the reserved memory 1416 executes and reconstructs the PCI memory mapping between CPU and packet processors and launches a temporary task. In one embodiment, this task will be activated every 100 mS (or some other appropriate time period), sending out protocol packets stored in the preserved memory. The service will be stopped when the application completes the hitless software upgrade initialization.

At this time, the monitor will also send a REBOOT message to the active MP (event 8), indicating to the active MP that the LP is booting up. The active MP will ACK the message (event 9), and in response the LP begins decompressing the compressed application image (event 10) that is stored in the code flash 1402*a*.

The decompressed application is stored in an area of the CPU address space 1402 to execute as the LP application 1414 (event 11). At this point, the monitor ceases the protocol sending service (event 12*a*) and allows the application to start sending protocols for L1-L7 functions or "keep-alive" packets (event 12*b*). The application will send an upgrade complete message to the active MP (event 13), after which time the active MP will resume its operation with the now booted LP (event 14*a*, 14*b*).

F. MP-to-MP Synchronization Framework (MPSF)

The following discussion is presented to provide a more complete description of active MP and standy MP switchover processing.

The MP-to-MP Synchronization Framework (MPSF) is a generic mechanism for synchronization between MPs. The MPSF provides the following functionalities:
1) Proxy server based baseline synchronization
2) Peer-to-peer based update synchronization
3) Blocking or non-blocking mode
4) Queuing service for non-blocking update synchronization MPSF synchronizes between software components. A software component can be a functional unit implemented in a program and executing on the management processor as a task. Examples include CLI or VLAN, or a service implemented in a library, such as forwarding identifier. All MPSF functionalities work per a software component id that is associated with each software component.

In order to add a new synchronization service, the following elements are needed:
1) a new software component id to identify the new service;
2) a baseline synchronization routine and an update synchronization routine to execute on the active MP; and
3) corresponding baseline and update processing routines to be executed on the standby MP.

Figure 5:
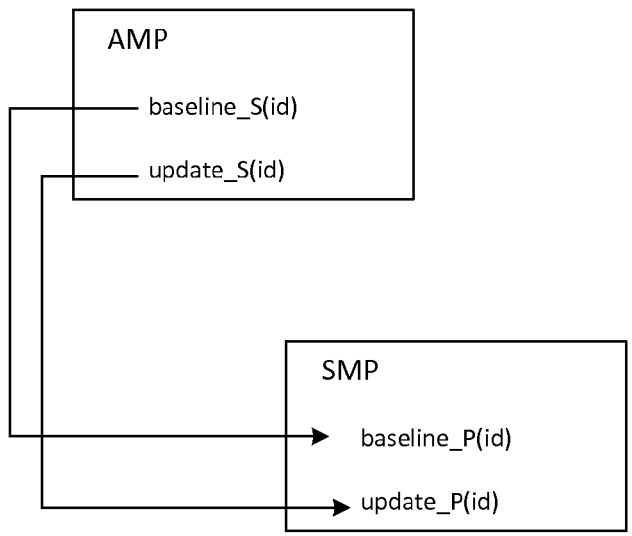
FIG. 5 is a schematic representation of the software relation between the active MP and a standby MP.

This architecture is schematically illustrated in FIG. 5. A task baseline_S( ) executing on the active MP (AMP) communicates with its counterpart task baseline_P( ) executing on the standby MP (SMP) to establish a baseline configuration for the task identified by the software component id parameter. Similarly, a task update_S( ) executing on the active MP communicates with its counterpart task update_P( ) executing on the standby MP to effect updates of the baseline configuration for the task identified by the software component id parameter.

As discussed above during startup, the running configuration read in by the active MP is synchronized by the active MP to the standby MP to establish the baseline state for the standby MP; i.e., baseline synchronization. The baseline synchronization of the running configuration is managed by the redundancy_task executing on the standby MP to establish the baseline state for all of the other tasks that will run on the standby MP subsequent to the startup sequence. The redundancy_task is therefore acting as a proxy for the other tasks, hence "proxy server based" baseline synchronization. It is noted that a baseline synchronization operation can be initiated if a standby MP is inserted into an already running system, in order to establish a baseline state for the newly inserted standby MP.

During normal operation, updates to the active MP will occur; e.g., updates by a user, updates from the linecard modules, etc. The standby MP will be synchronized with such updates by the active MP. Specifically, a task in the active MP which performs an update will initiate a sync operation (via it corresponding update routine) to sync the corresponding task in the standby MP by transferring the update information to the update routine in the standby MP corresponding to that task. This is referred to herein as peer-to-peer based synchronization since the task that performs the update in the active MP is the task that initiates the sync operation to the corresponding task on the standby MP.

The baseline or update synchronization operations can be performed in blocking mode or non-blocking mode. Critical states and data that are to be synchronized before further processing can be done should use blocking mode, otherwise, non-blocking mode is more appropriate. In addition, non-blocking mode sync operations need to be queued up in the active MP in order not to lose any configuration or state information that needs to be synced from the active MP to the standby MP. The term "synced" as used herein means copying information from a source (e.g., active MP) to a destination (e.g., standby MP).

1. Baseline Synchronization

The baseline in MPSF refers to states and databases upon which updates can be applied. Each software component has its corresponding set of state information. A software component must synchronize its baseline before any update can be synchronized. The baseline synchronization operation in MPSF is performed via scp_task. An important parameter in MPSF related to baseline is called "baseline_sync_done", which is initialized to zero ("0"). This parameter is set to one ("1") when the baseline synchronization successfully completes. When a software component gets out of sync between MPs, the baseline_sync_done parameter is reset to zero. This condition can arise, for example, when an update sync operation fails.

Depending on the value of "baseline_sync_done" and other conditions, an update synchronization request may be ignored, blocked or queued in accordance with the following:
1) baseline_sync_done=0
   If the baseline synchronization hasn't started, then all update synchronization requests are ignored.
   If the baseline synchronization has started, then an update synchronization request is:
      a) blocked (i.e., the caller task blocks on a semaphore) if the update synchronization is requested in blocking mode, or
      b) queued if the update synchronization is requested in non-blocking mode.
2) baseline_sync_done=1
   A non-blocking update synchronization request is:
      a) sent to standby MP if the queue is empty, or
      b) queued.
   A blocking update synchronization request is:
      a) blocked (i.e., the caller task blocks on a semaphore) if previous update synchronization is in progress, or
      b) sent to standby MP if it is the only update request at this time.

If a task does not want to be blocked, it can call an API to check if the baseline synchronization for a particular software component is busy. If yes, it can alter its processing accordingly. One example is the CLI. If the baseline (i.e., CLI session mode & running configuration) synchronization has not completed, the CLI will prohibit users from entering configuration commands.

2. Update Synchronization

As discussed in the previous section, after the baseline synchronization is done, update synchronization is performed based on its mode.

a) Non-Blocking Update Synchronization

If the queue is empty, the update is sent to the standby MP immediately. Otherwise, the update is put into a queue in the active MP. When the standby MP sends a message to the active MP to inform the active MP that the previous update synchronization has completed, the request sitting at the top of the queue in the active MP is sent to standby MP.

b) Blocking Update Synchronization

In the case where update requests come from different tasks (e.g., forwarding identifier synchronization), it is possible that when one update request is issued, there is already another one in progress. In this case, the second caller is blocked. When the one in progress is done, it releases the second one.

c) Error Handling

When a software component is out of sync between MPs, its consequences depend on the software component and the actual data. If the result of this out of sync state is only to cause a potential traffic hit during switchover, this is considered an example of a non-critical failure. Otherwise, it is considered a critical failure.

In a non-critical failure, it is sufficient for the software component to re-establish the baseline synchronization. Timeouts can be scheduled to perform the baseline synchronization again.

Figure 6:
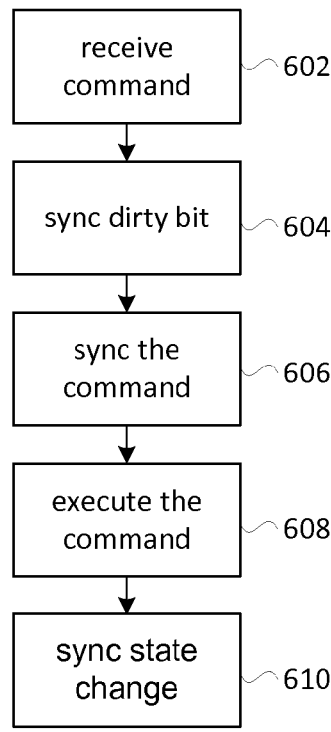
FIG. 6 illustrate sync processing using a "dirty bit"

In a critical failure, more drastic actions may be taken. There are two options:
1) Reset the standby MP, or put it in reset mode. This prevents an out of sync standby MP from taking over if the active MP crashes or is removed.
2) Use a "dirty-bit" to alert the standby MP as to which software component is out of sync. A hardware version of the "dirty-bit" implementation can be very efficient. With this mechanism, the order in which the actions are performed by the task is important. FIG. 6 illustrates the process:
   a) step 602—Suppose an action for a given task requires update synchronization. Before processing the action, perform the update synchronization first. For example, if a CLI task receives a command from the user, an update sync is performed to send that command from the active MP to the standby MP.
   b) step 604—However, before sending the update, the "dirty-bit" corresponding to that task is sent to the standby MP to indicate that this software component (the CLI in our example) is out of sync (or, more precisely, about to go out of sync) with respect to the active MP.
   c) step 606—After the "dirty-bit" is synchronized, send the update. In our example, the CLI command is sent to the standby MP after syncing the dirty bit corresponding to the CLI task.
   d) step 608—After the update is synchronized, perform the action in the active MP. Suppose in our example, the command is to "down" a port, the result would be a state change indicating that the specified port is down.
   e) step 610—After the action is taken, clear the "dirty-bit" and synchronize the state change to the standby MP. In our example, the down state is synced (sent) to the standby MP.

In this way, the standby MP can determine that a software component is out of sync by checking the its dirty-bit is when a switchover event happens. The actions that the newly active MP takes in this case can range from re-starting the software component to resetting the linecard modules.

Following is an illustrative listing of the MPSF API (application program interface). As noted above, each software (SW) component has a unique ID.

```
typedef enum {
    SW_COMPONENT_ID_CLI = 0,
    SW_COMPONENT_ID_CLI_SPECIAL,
    SW_COMPONENT_ID_SCP,
    SW_COMPONENT_ID_FWDING_ID,
    ...
    NUM_SW_COMPONENT
} SW_COMPONENT_ID;
/*********************************************************************/
/* Active MP Sync APIs                                               */
/*********************************************************************/
/*
 * This should be called once in scp_task.
 */
extern MP_SYNC_STATUS MpSyncInit( );
/*
 * This should be called once for each SW_COMPONENT_ID in scp_task.
 */
extern MP_SYNC_STATUS ActiveMpSyncInit(SW_COMPONENT_ID component_id,
    void (*baseline_sync_callback)(SW_COMPONENT_ID, MP_SYNC_STATUS),
    void (*update_sync_err_handler)(SW_COMPONENT_ID, MP_SYNC_STATUS));
/*
 * This should be called once in tasks that want to receive baseline sync result.
 */
extern MP_SYNC_STATUS MpSyncBaselineResultRequired(ITC_CONTEXT context);
/*
 * It sets the timeout for update sync. Default is 1 sec.
 */
extern void MpSyncSetTimeout(SW_COMPONENT_ID component_id, int timeout_in_ms);
/*
 * It sets the number of tries for update sync. Default is 3.
 */
extern void MpSyncSetRetryNum(SW_COMPONENT_ID component_id, int num);
/*
 * It should be called if baseline synchronization is performed w/o using MpSyncBaseLine( ); otherwise, it is not needed.
 */
extern void MpSyncBaseLineStart(SW_COMPONENT_ID component_id);
/*
 * It is called after baseline synchronization is done.
 */
extern MP_SYNC_STATUS MpSyncBaseLineEnd(SW_COMPONENT_ID component_id, MP_SYNC_STATUS status);
/*
 * It returns 1 if baseline sync is in progress.
 */
int MpBaselineSyncBusy(SW_COMPONENT_ID component_id);
/*
 * It performs baseline sync.
 * If "safe" is non-zero, it assumes "data" is good (i.e., no alteration or releasing) until the call returns;
 * If "safe" is 0, it duplicates data itself.
 */
extern MP_SYNC_STATUS MpSyncBaseLine(ITC_CONTEXT context, SW_COMPONENT_ID component_id, void *data, int
len, int blocking, int safe);
/*
 * It performs update sync.
 * If "safe" is non-zero, it assumes "data" is good (i.e., no alteration or releasing) until the call returns;
 * If "safe" is 0, it duplicates data itself.
 */
extern MP_SYNC_STATUS MpSync(SW_COMPONENT_ID component_id, void *data, int len, int blocking, int safe);
/*********************************************************************/
/* Standby MP Sync APIs                                              */
/*********************************************************************/
/*
 * This should be called once for each SW_COMPONENT_ID. It should be called by task
 * that's going to receive the msg.
 */
extern MP_SYNC_STATUS StandbyMpSyncInit(SW_COMPONENT_ID component_id, ITC_CONTEXT context,
    void (*baseline_sync_handler)(SW_COMPONENT_ID, char *, int),
    void (*update_sync_handler)(SW_COMPONENT_ID, char *, int));
```

G. Configuration Synchronization

This section discusses the synchronization of CLI (command line interface) configurations. Configuration commands typically involve configuration of one or more of the linecard modules 108. A CLI session is provided by executing the console_task on the active MP which be initiated from the console, or from a telnet session. Each CLI session operates independently of any other CLI sessions.

Figure 7:
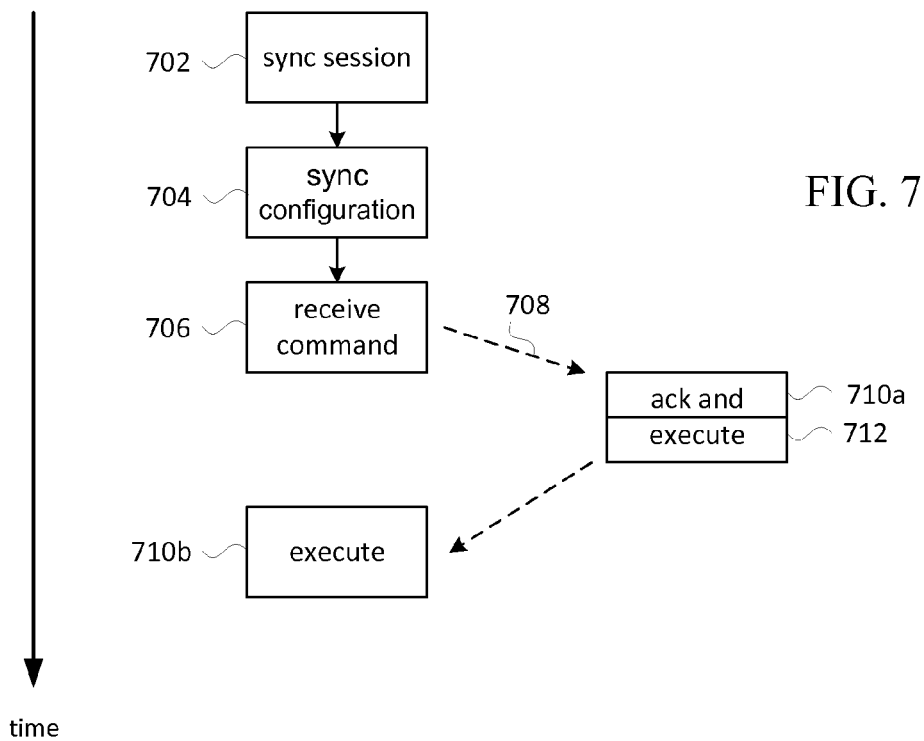
FIG. 7 illustrates CLI synchronization.

Referring to FIG. 7, when the standby MP comes up, a particular CLI session on the active MP may be active and, if so, will be in a particular configuration mode, such as in an interface mode (e.g., "interface Ethernet 3/1"), or in VLAN mode (e.g., "vlan 101"). It is important that the CLI sessions on the standby MP set up the correct mode before individual CLI commands can be synchronized to and correctly executed on the standby MP. This is the first piece of configuration related data that is synchronized to standby MP, step 702. Before an individual CLI command can be synchronized to the standby MP, the CLI's running configuration on the active MP must be synchronized to the standby MP. This is the second piece of configuration related data that is synchronized to standby MP, step 704. Together, these two pieces of data constitute the baseline for CLI configurations.

Once the baseline is established, each CLI configuration command is synchronized to the corresponding console_task running on the standby MP and executed. A filter is implemented such that non-configuration CLI commands (e.g., "show version") are not synchronized. Such non-configuration commands do not change the configuration state and so need not be synced.

A particular CLI configuration command is executed on the active MP in the following order:
1) step 706—A CLI configuration command is received.
2) step 708—The CLI configuration command is synchronized to the standby MP in blocking mode. That is, the console_task on the active MP blocks.
3a) step 710—When a synchronization acknowledgement is returned from the standby MP (step 710*a*), the console_task on the active MP unblocks and the CLI command is executed (710*b*).
3b) step 712—Asynchronously, the synchronized CLI command is executed on the standby MP.

The configuration information in the standby MP is likely to be more recent than the configuration of the linecard modules because the configuration command is synced to the standby MP (which then begins executing the command) before the configuration command is executed by the active MP itself, and the standby MP acknowledges the command and begins to process the command. Therefore, after an MP switchover completes, the newly active MP should re-send its configurations to the linecard modules in case the failed MP did not have a chance to configure the linecard modules before failing. Each linecard module can then update its cached configurations with the resent configurations. The linecard modules should execute those configurations that are missing from its cached configurations and ignore those configurations that were already executed. This re-send of configurations should be taken care of on a software component basis. This ensures that the actual configurations of the linecard modules match the configurations in the newly active MP.

H. Forwarding Identifier Synchronization

Software components use forwarding identifiers to manipulate traffic; e.g., forwarding data packets to their destinations. Forwarding identifier synchronization consists of two parts: 1) maintain correct forwarding identifiers for the software components in the active and standby MP's; and 2) synchronize forwarding identifier changes between the MP's.

If a software component that uses forwarding identifiers runs on both MPs, the software component in one MP must be guaranteed to be given the same forwarding identifier as its counterpart in the other MP when a request is made to allocate a forwarding identifier. To accomplish this, we need to make the process of allocating forwarding identifiers to be context-aware. In other words, a forwarding identifier that is allocated to a particular software component in the active MP is assigned an "application context". This "application context" is synchronized to the standby MP as part of the forwarding identifier structure for forwarding identifiers allocated in the standby MP. When the corresponding software component on the standby MP asks for a free forwarding identifier, the forwarding identifier mechanism can locate the correct forwarding identifier based on the "application context" supplied by the caller.

One issue with this mechanism is that the action of asking for a free forwarding identifier on the standby MP, and the synchronization of an allocated forwarding identifier (and the "application context" associated with it) are asynchronously performed. Consequently, the allocated forwarding identifier and its "application context" may not be synchronized when the software component on the standby MP requests a forwarding identifier, with the result that the allocated forwarding identifier will not match the forwarding identifier that was allocated in the active MP. A solution is to return "Invalid FWDING_ID" in this case. When the allocated forwarding identifier is finally synchronized, use its associated context to locate the software component data, and replace the "Invalid FWDING_ID" with the synchronized one.

Figure 8:
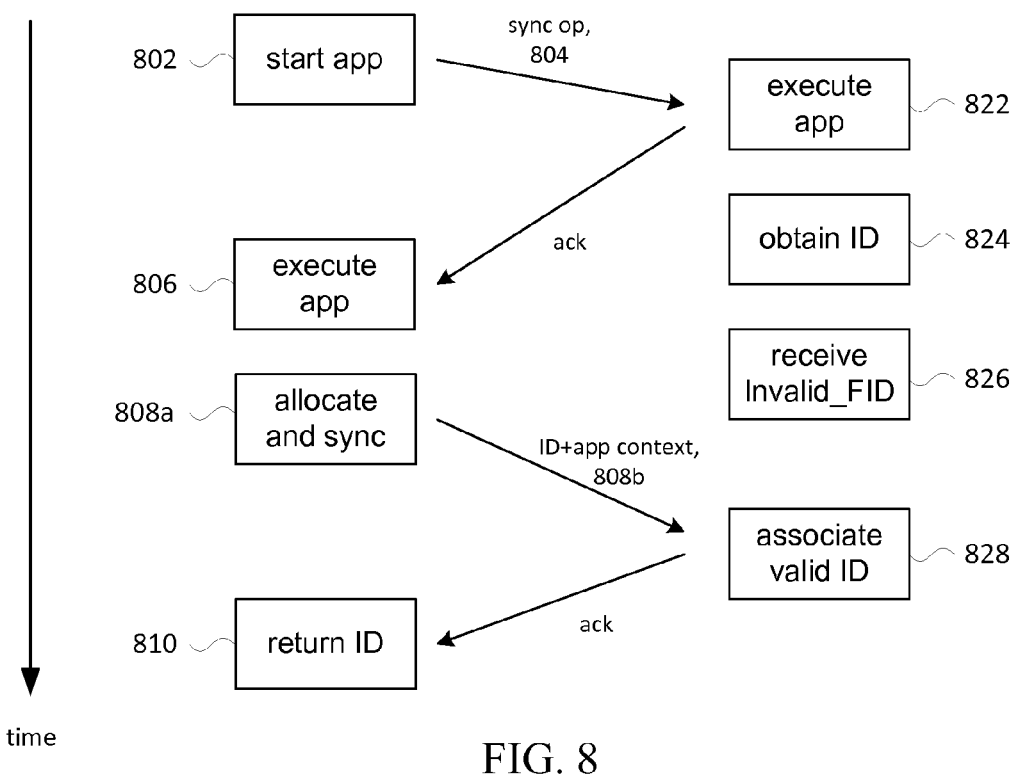
FIG. 8 illustrated forwarding identifier synchronization.

Following is an example of this mechanism with reference to FIG. 8:

On the active MP:
1) At step 802, a user initiates an application which requires a forwarding identifier, e.g., the user enters "vlan 101".
2) Before executing "vlan 101", it is synchronized to standby MP in blocking mode, step 804. That is, the standby MP is made aware of the initiation of the application.
3) After the synchronization returns, "vlan 101" is executed, and it will ask for a free forwarding identifier from the forwarding identifier mechanism, step 806.
4) The forwarding identifier mechanism allocates a free forwarding identifier from its free pool, associates the "application context" supplied by caller (in this case, vlan 101), step 808*a*, and synchronizes this forwarding identifier structure including the "application context" to standby MP in blocking mode, step 808*b*.
5) After the synchronization returns, forwarding identifier mechanism returns the allocated forwarding identifier, step 810.

On the standby MP:
1) The console_task receives "vlan 101" and executes it (step 822), which will ask for a free forwarding identifier from the forwarding identifier mechanism, step 824.
2) Instead of allocating a free forwarding identifier from its free pool, the forwarding identifier mechanism searches for the forwarding identifier whose "application context" matches that supplied by the caller (in this case, vlan 101). If a matching forwarding identifier is found, return it; otherwise, return "Invalid FWDING_ID", step 826.
3) When the forwarding identifier with "vlan 101" application context is received, the forwarding identifier mechanism uses the application context "vlan 101" to locate the matching SW component data (in this case, the vlan entry). If the matching SW component data isn't found, do nothing; otherwise, replace the entry's forwarding identifier with the one just received, step 828.

I. Trunk Synchronization

A "trunk" command issued via a CLI is synchronized to the standby MP and executed there. The trunks on the standby MP will have all ports disabled since all of the linecard modules 108 are in a "Not Present" state. When switchover happens, trunk configurations are re-sent to the linecard modules by the newly active MP. Each linecard module will execute those configurations that are missing from its cached configurations, and ignore those configurations that were already executed. In this way, the actual trunk configurations of the linecard modules will match the trunk configurations in the newly active MP.

For a trunk to work properly across an MP switchover, the following issues need to be resolved:
1) trunk id—A trunk created with the same ports must have the same trunk id. To achieve this, a trunk id allocated in the active MP is synchronized to the standby MP. This mechanism is similar to forwarding identifier.
2) forwarding identifier groups allocated for a server trunk—Sixteen forwarding identifier groups are allocated for a server trunk at initialization time. These forwarding identifier groups are fixed. The only change needed is to associate each trunk id with a fixed forwarding identifier group.
3) cached configurations in the linecard modules—As discussed above, each linecard module needs to cache its trunk configurations so that on MP switchover, it can compare its cached configuration against those re-sent by the newly active MP.

J. L2 Design

The foregoing sections introduced various components in the underlying architecture for redundant operation in network switching equipment in accordance with the present invention. An overview of various Layer 1 (L1) entities and their processes were also discussed. The following sections provide an overview of various Layer 2 (L2) entities that execute on the active MP and their functions. It also summarizes the requirements from each of these entities. Each L2 entity will be discussed in more detail under each subsection. Within each subsection, two specific aspects are addressed—
1. Interaction between L2 entities across the management modules.
2. Failover event handling on the standby MP including changes to the L2 entity agent in the line card.

Typical layer 2 entities include a MAC (media access control) manager, a VLAN (virtual local area network) manager and L2 protocol managers for non-proprietary protocols such as STP (spanning tree protocol), RSTP (rapid spanning tree protocol), MSTP (multiple spanning tree protocols), and protocols such as MRP (metro ring protocol) and VSRP (virtual switch redundancy protocol) which are proprietary protocols owned by the assignee of the present invention. On MP switchover, the newly active MP is faced with line cards (also referred to herein as line cards) that are already initialized and contain configuration and state that may or may not be in sync with the newly active MP. Therefore, the configuration and states in the line cards need to be verified, updated, and/or synchronized to match the newly active MP.

A function of the MAC manager is to perform MAC station learning and propagation/synchronization functions. When a MAC station is unknown, the database manager learns the MAC by adding to its database and synchronizes the newly learned MAC station to all line cards that may be interested. When the line cards detect an MP switchover event, they send the list of MAC addresses that were learnt locally to the newly active MP. The management module then updates its own MAC station table. It is noted that in any event the MAC station learning process in the MAC manager is self-healing in that it will auto-correct even if synchronization by the line cards does not take place correctly.

The VLAN manager allows a user to configure port memberships and properties associated with corresponding VLAN identifiers. It interacts with the protocols to propagate port state changes and MAC station flush requests. It also interacts with a VLAN agent executing on a line card to program its hardware. Further, the VLAN manager handles grouping mechanisms such as topology groups and vlan-groups. On MP switchover, the VLAN manager executing on the standby MP is expected to know the configuration (port memberships and properties) associated with individual VLANs. This configuration may need to be verified against the information that is currently stored in the line cards.

Each protocol manager (e.g., STP manager, MRP manager, VSRP manager, etc) operates specific protocol instances over certain sets of ports. The protocol manager can operate multiple instances of the protocol with different port memberships. The relationship of each protocol manager with the line cards is limited—it is only associated with programming the CAM (content addressable memory) to allow protocol packets to be processed on a blocked port. The MRP manager also sets up CAM entries to allow protocol packets to be forwarded by hardware. On MP switchover, the protocol manager needs to check if the line cards have their CAM's programmed as expected. There are other issues such as handling acknowledgments from the line card associated with setting the port state and packet sequence number matching (discussed in more detail below).

The synchronization paradigm for L2 entities generally follows the MPSF framework. The L1 processes discussed above synchronize the configuration to the standby MP. The L2 processes focus on enforcing the configuration on the line cards. The L2 processes running on the standby MP do not perform an explicit step of learning the linecard configurations. Instead, events from the line cards that are normally sent to the active MP are also sent to the standby MP. Thus, the L2 processes on the standby MP receive all line card events as they are received by the active MP. Thus, there is no need for the active MP to sync events it receives to the standby MP. This approach has the following benefits:
1. Reduces the number of IPC messages between the active MP and standby MP that would be needed in order to synchronize states in the active MP.

Reduces the complexity associated with keeping the management modules in sync. Since all the events received by both management modules are the same.

On MP switchover, the L2 processes on the newly active MP will enforces its configuration and state onto the line cards, thus guaranteeing that the configuration information in the newly active MP matches the configuration of the line cards.

1. Mac Synchronization

The MAC manager keeps track of the MAC station table. In a specific embodiment of the present invention, this table can store up to 2 million MAC entries at capacity. The standby MP does not keep track of the MAC station table. There is no synchronization of MAC table entries between the active MP and the standby MP in the start-up sequence discussed above. Therefore, when the standby MP becomes active, its MAC table is empty.

Figure 9:
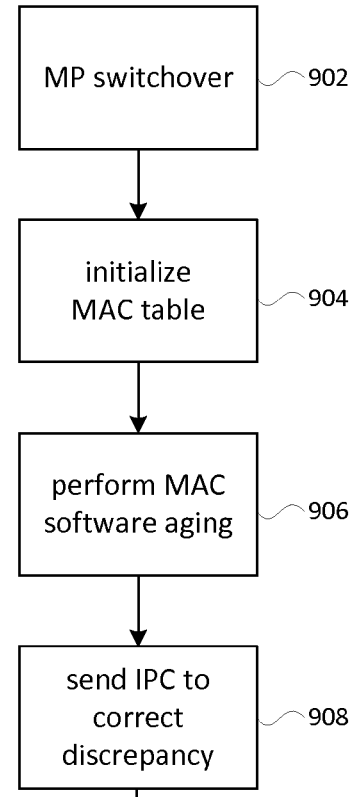
FIG. 9 illustrates MAC synchronization.

Refer to FIG. 9 for the following discussion of MAC synchronization according the present invention. On MP switchover, the line cards each detect that the active MP has changed (step 902). In response to this detection, the line card sets up the newly active MP to initialize the MAC station table in the newly active MP. The MAC station table is initialized during the L1 synchronization process (step 904); i.e., it establishes the baseline MAC station table. During a process known as the MAC software aging cycle, the MAC agent on the line card verifies all the MAC entries that have been learned on its local ports; i.e., the ports that belong to the linecard in question (step 906). Each MAC entry contains information about the management module that the MAC entry was learned from. If there is a mismatch in the management module id on the MAC entry and the currently active MP, the MAC linecard agent will assume that the active MP may not know about this MAC entry. Consequently, the MAC agent will send an IPC message to the newly active MP to indicate and correct this discrepancy (step 908).

The newly active MP processes this request as a learn request by updating its MAC station table with information provided by the line card (step 910). Once it updates its own MAC station table, the MAC manager executing on the newly active MP synchronizes the MAC information to the other line cards (step 912). When this MAC entry is synchronized, each receiving line card updates its MAC entry to reflect the change in the management module id (step 914). This approach has many benefits:

1. Simplicity: The scheme is innately simple and easy to understand/debug.
2. Synchronization: By avoiding the need to communicate between management modules to synchronize the MAC station table, significant compute and IPC network resources are conserved.

2. VLAN Synchronization

The VLAN manager mostly handles configuration requests and protocol requests. It also triggers events and updates when required. The L1 process will synchronize the baseline configuration. This means that the VLAN entity on the standby MP will be configured exactly as in the active MP. This may not always be true, however, since it is possible that the configuration may have gone out of sync, for example, if the active MP crashed during a specific configuration command.

The basic framework as discussed above is that the VLAN processes on the standby and active MP's operate more or less independently of each other. The L1 process gives the same inputs to both the active and the standby (e.g., port up events, trunk create events, etc.) This would allow the state on the VLAN operational parameters to be in sync.

a) Interaction Between Standby and Active MP

The standby MP will not perform any operation that requires communication with a line card. Effectively, it will not send out IPC messages to the line card and will not process IPC messages from the line card. The VLAN manager in the active MP expects an ACK from the line card; e.g., when setting the state associated with an RSTP port. This ACK will not be required by the corresponding VLAN manager executing on the standby MP. There is little synchronization between the VLAN manager processes across management modules.

Forwarding identifier synchronization between standby and active MPs is an important issue. Since the VLAN manager processes are independent across MPs, it is possible that the forwarding identifier manager in one MP (e.g., the active MP) will not return the same forwarding identifiers to matching VLANs in the other MP. This is especially true if the standby MP is booted up after numerous configuration steps have been taken place on the active MP (i.e., the VLANs have been configured out-of-order). Since the active MP has already synchronized all the forwarding identifier database information to the line card, it would be difficult to modify the forwarding identifiers associated with VLANs. Thus, in accordance with an embodiment of the present invention, forwarding identifier synchronization is handled in L1 processing as discussed above.

VLAN synchronization proceeds as follows:
1. The VLAN manager on the active MP requests the forwarding identifier manager for a forwarding identifier. As discussed above, the VLAN request is synced to the standby MP. Also as discussed above, on the standby MP, the forwarding identifier manager will return INVALID_FWDING_ID. The VLAN manager on the standby MP nevertheless continues servicing the request without valid forwarding identifier information.
2. The forwarding identifier manager on the active MP will eventually synchronize a valid forwarding identifier to the standby MP. At this time, the forwarding identifier manager on the standby MP will update the VLAN data structures with the appropriate forwarding ID.

This same process is used for an uplink-vlan configuration, since uplink-vlan configurations also lead to a forwarding identifier request.

b) Failover Event Handling

When a failover event is detected, an MP switchover occurs and the standby MP becomes the active MP. The newly active MP will send and receive IPC messages. As discussed above, the newly active MP synchronizes its current state with all the line cards that are currently operational. This includes the VLAN configuration, the topology group configuration, the SuperSPAN™ and VE configurations, and so on. This could lead to overwriting on some structures in the line cards. However, if the management modules were synchronized at the time of MP switchover, this would not lead to any changes. Changes are required from the line card to be able to interpret the changes.

In accordance with another embodiment of the present invention, the management modules may be kept in sync every step of the way. The management modules would then be more likely to be synchronized when FAILOVER happens. Another approach is to have a dead time on the line card when conflict-resolution was attempted (This was in the case when there were differences between the standby module and the line cards). Using this approach, the information in the line cards is considered, the traffic is not stopped even if there are differences in the line card and management module states.

c) Line Card VLAN Agent

There are minimal changes in the line card to process an MP switchover event. These are mostly verification routines to make sure that the VLANs are all configured correctly. If the VLAN information in the newly active MP does not match the line card configuration or is out-of-date, it will still be used because that is the state that the newly active MP sees at this point. The current approach of overwriting the line card state and configuration with what is known to the newly active MP simplifies implementation on the VLAN agent.

In operation, the VLAN agent compares the configuration on the newly active MP with the configuration in the line card. If the configuration is different, the VLAN agent modifies its configuration in the line card to match the configuration on the newly active MP. This could be enhanced as described earlier with conflict-resolution type implementation where the differences are flagged and revisited after a certain interval (called dead-time).

In one embodiment, the line card VLAN agent always starts with a clean slate when the active MP fails and the standby MP takes over. Processing in the line card includes:
1. Verification to check the validity of the various configurations on the line card.

2. Differentiating between the configuration that is currently in place in the line card and the configuration that is being received from the newly active MP.
3. Overwriting the configuration received from the previously active MP.

3. Protocol Synchronization

Protocol synchronization is different from VLAN synchronization in that there is little interaction between the protocol manager on the active MP and the protocol agent in the line card. In fact, most of the protocol interaction with the line card is through the VLAN manager. However, the interaction between the protocol entities across management modules may need to be significantly higher.

An example of an issue would be the case when the standby MP is booted up after the STP (spanning tree protocol) manager on the active MP has converged. The corresponding STP manager on the standby MP requires some amount of time to converge, and so the spanning trees between the active MP and standby MP will not match for a period of time.

In one embodiment of the present invention, protocol synchronization is performed in a manner similar to that of the VLAN synchronization. In this embodiment, each protocol may run independently on the standby MP. It would receive all events and protocol packets from the line card in order to keep it up to date with the active MP. This is referred to herein as "protocol redundancy."

a) Protocol Redundancy for STP (Spanning Tree Protocol)

Figure 10:
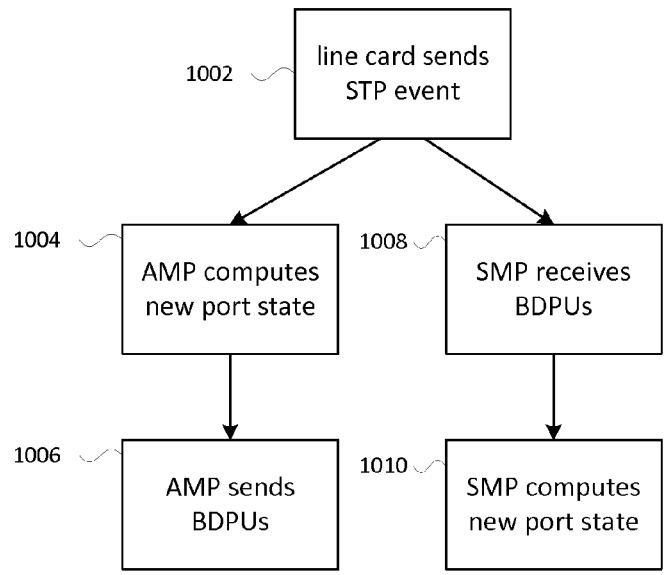
FIG. 10 illustrates protocol synchronization according to the present invention using the STP protocol as an example.

In the case of STP, the port states are computed in a predictable manner for a given configuration of bridge protocol data units (BDPUs). This fact allows the standby MP to arrive at the same STP result (port state configuration) as in the active MP when the former becomes the newly active MP. Referring to FIG. 10, the STP manager on the standby MP will receive all events as received by the active MP. Specifically, when a line card sends an STP event (step 1002), both the active MP and the standby MP will detect the occurrence of the event. The active MP will compute the new port states (step 1004) and send BDPUs to communicate the change in ports (step 1006). The STP manager on the standby MP, on the other hand, will not send out BPDUs, but will receive and process BPDUs in order to calculate port states from the information contained in the received BPDUs (step 1008). These port states are synchronized to the VLAN manager on the standby MP. When a FAILOVER event is received, the standby STP manager enables transmission of BPDUs. The VLAN manager will take care of synchronizing the states of individual ports.

STP TCNs (Topology Change Notifications) require acknowledgement from the root bridge. It is possible that when the standby MP comes up after the active MP, its TCN will go unacknowledged. This is because the root bridge is not really seeing the BPDUs of the standby MP. To account for this case, the STP TCNs in the standby MP will be assumed to receive acknowledgements.

b) Protocol Redundancy for RSTP

In the case of the RSTP protocol, the RSTP manager on the standby MP will receive all events as received by the active MP. The RSTP manager in the standby MP will not send out BPDUs but will receive and process BPDUs.

The relationship with the VLAN manager is tricky due to the ACK mechanism (blocking port state set call). In order to proceed with the RSTP Port state transitions (PST) state machine, an ACK from the line card is needed. This ACK is needed to confirm that the port has been set to the appropriate state.

Therefore, according to an embodiment of the present invention, all port state set calls will be non-blocking on the standby MP (both the VLAN manager and RSTP manager use non-blocking calls). The standby will also ignore ACKs sent by the line card. The linecard will also send the ACK to the management module that made the request, rather than to the active MP. This will avoid corner cases during failover such as when the ACK is incorrectly sent to the active MP causing a transition before the hardware is setup.

RSTP requires handshaking (in some cases) between peers on point-to-point links. An example is the proposal-agree mechanism between a designated port and the root port. If this handshake is already completed by the time the standby MP comes up, the RSTP manager running on the standby MP will never know that the handshake had been performed.

Solution: There are two cases here—(1) when the standby has a designated port that should have received a BPDU with the "agree flag" set, or (2) the standby has a root port that should have received a BPDU with the "propose flag" set.

c) Protocol Redundancy for MRP

Although MRP is a proprietary protocol, a brief discussion of redundancy processing for MRP will be made for completeness. The MRP manager on the standby MP will receive all events and packets called "ring PDUs" (similar to BPDUs) as received by the MRP manager in the active module. There are issues in the MRP that are not related to spanning-tree protocols.

1. Sequence number sent per ring PDU: The metro-ring protocol sends out ring PDUs every 100 ms. Each PDU has a sequence number associated with it that is used in diagnostics. This sequence number needs to be matched on both the standby MP and the active MP. The metro-ring protocol on the standby MP skips the sequence number check the first time and updates the sequence number based on the received sequence number.
2. MRP sessions for each MRP flow: These are required to hardware forward ring PDUs. Each MRP session needs to be learned and deleted when done.
3. Short convergence times: MRP has very short convergence times of about 300 ms. This may not be achieved when FAILOVER is in progress. When a FAILOVER event is received on a master MRP node, the dead-time is increased significantly (e.g., from 300 ms to about 8 seconds). This allows the management module to run verification checks on the linecard data sanity without MRP re-converging.

d) Protocol Redundancy for VSRP

Although VSRP is a proprietary protocol, a brief discussion of redundancy processing for VSRP will be made for completeness. VSRP shares similar issues as MRP. Due to the increased sensitivity of the protocol, it is imperative that VSRP/MRP packets get sent out from the standby MP as soon as it becomes active. This is achieved by running the VSRP manager on both the active MP and the standby MP. VSRP will re-converge within 800 ms if VSRP packets cannot be sent or received.

When a FAILOVER event is detected, VSRP freezes the timers to allow the line card to initialize. The following timers are frozen: dead timer, the hold down timer, backup expiry timer. The dead timer and the hold-down timer keep track of the time since the last VSRP message was received from the VSRP master.

Transmission of VSRP packets will continue as scheduled since the VSRP manager on the standby MP is operating under the assumption that it is the active MP. Once L1 detects the switchover, it will allow transmission of L2 protocols that were previously black holed.

e) Protocol Redundancy—VSRP Aware

Although VSRP aware is a proprietary protocol, a brief discussion of redundancy processing for VSRP aware will be made for completeness. VSRP aware sessions are synchronized by the linecard on startup. This process is similar to the MAC table synchronization. The standby MP does not store VSRP aware sessions. On failover, the newly active MP does not have any VSRP aware sessions stored.

When a line card detects the arrival of the newly active MP, it traverses through all of its local VSRP aware sessions and sends the information to the newly active MP. The newly active then synchronizes these sessions to the other line cards. An aware session that does not get anymore VSRP packets will simply age out.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

What is claimed is:

1. A system comprising:
a first processor; and
a second processor;
wherein the first processor is configured to operate, using a first image, in an active mode and the second processor is configured to operate, using the first image, in a standby mode while the first processor is operating in the active mode;
wherein the first processor is capable of performing a set of functions while operating in the active mode;
wherein the second processor is not capable of performing the set of functions while operating in the standby mode; and
wherein in response to a signal:
the first processor is configured to cease operating in the active mode;
the second processor is configured to, using the first image, start operating in the active mode when the first processor ceases operating in the active mode, wherein the second processor is capable of performing the set of functions while operating in the active mode;
the first processor is configured to boot with a second image, the second image being different from the first image, and subsequent to booting with the second image start operating in the standby mode using the second image, wherein the first processor is not capable of performing a second set of functions while operating in the standby mode;
the second processor is configured to cease operating in the active mode;
the first processor is configured to, using the second image, start operating in the active mode when the second processor ceases operating in the active mode, wherein the first processor is capable of performing the second set of functions when operating in the active mode; and
the second processor is configured to boot with the second image, and subsequent to booting with the second image start operating in the standby mode using the second image, wherein the second processor is not capable of performing the second set of functions while operating in the standby mode.

2. The system of claim 1 wherein the second image comprises a software component.

3. The system of claim 1, wherein the second processor, while operating in the standby mode, is configured to receive network traffic information from the first processor while the first processor is operating in the active mode, the network traffic information enabling the second processor to switch to the active mode.

4. The system of claim 1, wherein the second processor, while operating in the standby mode, is configured to receive network traffic that is received by the first processor while the first processor is operating in the active mode, wherein the second processor, while operating in the standby mode, is configured process the network traffic and determine to drop the network traffic.

5. The system of claim 1, wherein the first processor is configured to load the second image while in the active mode.

6. The system of claim 1, wherein the second processor is configured to start operating in the active mode upon receiving an interrupt signal.

7. The system of claim 1, wherein the second processor is configured to:
upon switching from the standby mode to the active mode, initiate a timer; and
perform the second switchover upon expiration of the timer.

8. A method comprising:
operating a first processor in a network device in an active mode, wherein the first processor is capable of performing a set of functions while the first processor is operating in the active mode;
operating a second processor in the network device in a standby mode while the first processor is operating in the active mode, wherein the second processor is not capable of performing the set of functions while operating in the standby mode; and
upon receiving a signal:
ceasing operation of the first processor in the active mode;
switching operation of the second processor to the active mode when the first processor ceases operating in the active mode; wherein the second processor is capable of performing the set of functions while operating in the active mode;

booting the first processor with a new image, and subsequent to booting with the new image operating the first processor in the standby mode, wherein the first processor is not capable of performing a second set of functions while operating in the standby mode;

ceasing operation of the second processor in the active mode;

using the second image, switching operation of the first processor to the active mode when the second processor ceases operating in the active mode, wherein the first processor is capable of performing the second set of functions while operating in the active mode; and booting the second processor with the new image, and subsequent to booting with the new image operating the second processor in the standby mode, wherein the second processor is not capable of performing the second set of functions while operating in the standby mode.

9. The method of claim 8 wherein the new image comprises a software component.

10. The method of claim 8, further comprising receiving, by the second processor while the second processor is operating in the standby mode, network traffic information from the first processor while the first processor is operating in the active mode, the network traffic information enabling the second processor to switch to the active mode.

11. The method of claim 8, further comprising:
receiving, by the second processor while the second processor is operating in the standby mode, network traffic that is received by the first processor while the first processor is operating in the active mode; and
processing, by the second processor while the second processor is operating in the standby mode, the network traffic, wherein the processing includes determining to drop the network traffic.

12. The method of claim 8, further comprising loading, by the first processor while the first processor is in the active mode, the new image.

13. The method of claim 8, switching the second processor to the active mode upon receiving an interrupt signal.

14. The method of claim 8, further comprising:
upon the second processor switching from the standby mode to the active mode, initiating a timer; and
performing the second switchover upon expiration of the timer.

15. A method comprising:
executing, using a second processor in a network device, a first program stored in a first region of memory, wherein the first region of a memory is associated with the second processor, wherein the second processor is operating in a standby mode, wherein the second processor is not capable of performing a set of functions while the second processor is operating in the standby mode, the set of functions including transmitting data packets from the network device;

receiving, at the second processor, data comprising a second program, wherein the data is received from a first processor in the network device, wherein the data is received while the second processor is executing the first program, wherein the first processor is operating in an active mode, and wherein the first processor is capable of performing the set of functions associated with the first program while operating in the active mode;

storing the data comprising the second program in a second region of the memory associated with the second processor;

replacing the first program stored in the first region of the memory with the second program; and booting the second processor, wherein subsequent to booting the second processor is executing the second program and operating in the standby mode, wherein the second processor is not capable of performing a second set of functions while operating in the standby mode.

16. The method of claim 15 wherein the data comprises the second program in compressed form, the method further comprising decompressing the data to generate the second program.

17. The method of claim 15, further comprising:
booting the first processor, wherein subsequent to booting the first processor is executing the second program and operating in the active mode, wherein the first processor is capable of performing the second set of functions while operating in the active mode.

18. The method of claim 17, further comprising:
upon booting the first processor, switching the second processor from the standby mode to the active mode, wherein the second processor is capable of performing the set of functions while operating in the active mode; and
subsequent to booting the first processor, switching the second processor from the active mode to the standby mode.

19. The method of claim 15, further comprising receiving, by the second processor while the second processor is operating in the standby mode, network traffic information from the first processor while the first processor is operating in the active mode, the network traffic information enabling the second processor to switch to the active mode.

20. The method of claim 15, further comprising:
receiving, by the second processor while the second processor is operating in the standby mode, network traffic that is received by the first processor while the first processor is operating in the active mode; and
processing, by the second processor while the second processor is operating in the standby mode, the network traffic, wherein the processing includes determining to drop the network traffic.

* * * * *